US010751612B1

(12) United States Patent
Urbanus et al.

(10) Patent No.: US 10,751,612 B1
(45) Date of Patent: Aug. 25, 2020

(54) MEDIA MULTI-TASKING USING REMOTE DEVICE

(71) Applicant: Sony Interactive Entertainment LLC, San Mateo, CA (US)

(72) Inventors: Jonathan Nisser Ford Urbanus, Los Angeles, CA (US); Peter Alfred Cruz Bautista, San Marcos, CA (US); Thomas Harold Bair, San Rafael, CA (US); Steve Edward Silvas, Vallejo, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 16/376,942

(22) Filed: Apr. 5, 2019

(51) Int. Cl.
*A63F 13/235* (2014.01)
*A63F 13/25* (2014.01)
*H04N 21/422* (2011.01)
*A63F 13/85* (2014.01)

(52) U.S. Cl.
CPC ............ *A63F 13/235* (2014.09); *A63F 13/25* (2014.09); *A63F 13/85* (2014.09); *H04N 21/42204* (2013.01); *A63F 2300/1031* (2013.01); *A63F 2300/308* (2013.01)

(58) Field of Classification Search
USPC .......................................................... 463/31
See application file for complete search history.

(56) References Cited

U.S. PATENT DOCUMENTS

| 2009/0066639 | A1* | 3/2009 | Heitmann | G10H 1/20 345/156 |
| 2009/0067641 | A1* | 3/2009 | Lengeling | G10H 1/20 381/80 |
| 2009/0069916 | A1* | 3/2009 | Homburg | G10H 1/20 700/94 |
| 2016/0259498 | A1* | 9/2016 | Foss | G06F 3/016 |
| 2016/0259519 | A1* | 9/2016 | Foss | G06F 3/0482 |
| 2018/0020041 | A1* | 1/2018 | Heeter | H04N 21/41407 |
| 2018/0335939 | A1* | 11/2018 | Karunamuni | G06F 3/0481 |
| 2019/0212892 | A1* | 7/2019 | Karunamuni | G06F 3/04817 |

* cited by examiner

*Primary Examiner* — Pierre E Elisca
(74) *Attorney, Agent, or Firm* — Kilpatrick Townsend & Stockton LLP

(57) ABSTRACT

Systems and methods for enabling concurrent user interaction with a plurality of applications executing on a computer system are disclosed. Generally, the computer system includes a video game controller, a remote control including a plurality of buttons, and a video game system communicatively coupled with the remote control and the video game controller. While presenting video game output of video game in a foreground of a display and media output of a media application on the display, the video game system may maintain a mapping indicating that a first set of the plurality of buttons is used for controlling execution of a media application. Based on receiving a signal corresponding to a push of a button of the first set, and the mapping, the video game system may control the execution of the media application while continuing to present the video game output in the foreground.

20 Claims, 11 Drawing Sheets

| SCENARIO PARAMETERS | | | | RESULTING STATE & FUNCTION OUTPUT | | |
|---|---|---|---|---|---|---|
| PRIMARY (MAIN SCREEN) APP | SECONDARY APP | BUTTON | | BUTTON STATE 710 | APP CONTROLLED 712 | CONTROL FUNCTION EX. 714 |
| VIDEO GAME | AUDIO 1 | MEDIA TRANSPORT CONTROLS | | ENABLED | SECONDARY | -FFWD/RWD: +/- 5 SECONDS -PLAY/PAUSE |
| VIDEO GAME | AUDIO 2 | MEDIA TRANSPORT CONTROLS | | ENABLED | SECONDARY | -FFWD/RWD: NEXT/PREV. TRACK -PLAY/PAUSE |
| VIDEO GAME | VIDEO 1 | MEDIA TRANSPORT CONTROLS | | ENABLED | SECONDARY | -FFWD/RWD: +/- 10 SECONDS -PLAY/PAUSE |
| VIDEO GAME | VIDEO 2 | MEDIA TRANSPORT CONTROLS | | ENABLED | SECONDARY | -FFWD/RWD: +/- 30 SECONDS -PLAY/PAUSE |
| HOME SCREEN | NON-VIDEO GAME MEDIA APP (E.G., VIDEO 1) | MEDIA TRANSPORT CONTROLS | | ENABLED | SECONDARY | -FFWD/RWD: +/- 10 SECONDS -PLAY/PAUSE |
| VIDEO 2 | VIDEO 1 | MEDIA TRANSPORT CONTROLS | | ENABLED | MAIN | -FFWD/RWD: +/- 30 SECONDS -PLAY/PAUSE |
| VIDEO 2 | VIDEO 1 | MEDIA TRANSPORT CONTROLS | | ENABLED | SECONDARY (USING CONTROL CENTER) | -FFWD/RWD: +/- 10 SECONDS -PLAY/PAUSE |
| VIDEO GAME | NON-VIDEO GAME MEDIA APP | DIRECTIONAL PAD | | DISABLED | N/A | N/A |
| HOME SCREEN | NON-VIDEO GAME MEDIA APP | DIRECTIONAL PAD | | ENABLED | MAIN | NAVIGATE HOME SCREEN |
| NON-VIDEO GAME MEDIA APP | VIDEO 1 | DIRECTIONAL PAD | | ENABLED | MAIN | NAVIGATE NON-VIDEO GAME MEDIA APP |

FIG. 7

MEDIA MULTI-TASKING USING REMOTE DEVICE

CROSS-REFERENCES TO RELATED APPLICATIONS

NOT APPLICABLE

BACKGROUND

Modern computer systems allow users to interact with multiple applications that are running on a computer system. For example, in a typical personal computer, a user may have multiple windows open at the same time. One window may display a document window from a word processing application, which allows the user to type into the document window. Meanwhile, another window may display a video feed from a video application, which the user may watch while simultaneously taking notes in the document window. In another example, a user may play a video game by interacting with a display screen of a video game system via a video game controller, whereby the video game controller issues commands to a video game application executing on the video game system. While playing the game, the user may play music generated from another music application on a speaker of the video game system. The user may periodically switch focus to the music application to advance to a desired track, and then return focus to playing the video game.

While, as described above, existing computer systems typically allow multiple outputs from applications (e.g., video feed, audio feed) to be concurrently presented on a device (e.g., display monitor, speaker) of the computer system in order for a user to interact with an application, these existing computer systems require a user to switch an application's focus from the (graphical user interface) GUI background to the foreground. However, these constraints introduce technical challenges for existing computer systems that support multiple applications concurrently running on the same computer system. Therefore, there is a need to improve user interaction with multiple concurrently executing applications on a computer system.

BRIEF SUMMARY

Generally, techniques for controlling the execution of a computer system application are described. In an example, a computer system includes a first input device configured to control one or more media applications (e.g., a remote control), a second input device configured to control one or more video game applications (e.g., a video game controller), and a video game system that is communicatively coupled with the first input device and the second input device. The video game system includes a processor and a memory that stores instructions that, upon execution by the processor, cause the video game system to perform operations. In one operation, the video game system presents, in a foreground of a display, video game output based on an execution of a video game application and commands from the second input device. In another operation, the video game system presents, on the display and while the video game output is presented in the foreground, a media output based on an execution of a media application other than the video game application. In another operation, the video game system maintains a mapping indicating that a first set of a plurality of user inputs received at the first input device is used for controlling the execution of the media application. In an example where the first input device is a remote control, a button of the remote control is be configured to enable fast-forwarding or rewinding the media output on the display. In another operation, the video game system receives from the remote control, and while presenting the video game output in the foreground, a signal corresponding to a first user input of the first set. In another operation, the video game system determines, based on the mapping, that the signal corresponds to controlling the execution of the media application. In another operation, the video game system controls the execution of the media application based on the signal while the presenting of the video game output continues in the foreground.

In an example, the execution of the instructions further causes the video game system to perform operations. In one operation, the video game system presents the media output in the foreground of the display, wherein the media output is presented in conjunction with the video game output, and controlling the execution of the media application comprises changing an aspect of the media output. In another example, the presenting of the media output and the presenting of the video game output include presenting a composite output based on a rendering process that receives the media output from the media application and the video game output from the video game application as distinct inputs. In yet another example, the media output is presented in a background of the display. In this example, controlling the execution of the media application includes changing an aspect of the media output while maintaining the media output in the background.

In an example, the execution of the instructions further causes the video game system to perform operations. In one operation, the video game system determines, based on the mapping, that a second set of the plurality of user inputs is not used for controlling the execution of the media application. In another operation, responsive to receiving a second signal corresponding to a second user input of the second set, the video game system ignores the second signal.

In an example, the execution of the instructions further causes the video game system to perform operations. In one operation, the video game system presents, in the foreground of the display, a home screen output based on an execution of a native system application. In another operation, the video game system receives, from the remote control and while the home screen output is in the foreground, a second signal corresponding to a second user input of the first set. In yet another operation, the video game system determines, based on the mapping, that the second signal corresponds to controlling the execution of the media application. In another operation, the video game system controls the execution of the media application based on the second signal while the presenting of the home screen output continues in the foreground.

In an example, the mapping maintained by the video game system further indicates that a second set of the plurality of user inputs is used for controlling the execution of the native system application. In an example, the execution of the instructions further causes the video game system to perform operations. In one operation, the video game system receives from the remote control a third signal corresponding to a third user input of the second set. In another operation, the video game system determines, based on the mapping, that the third signal corresponds to controlling the execution of the native system application. In yet another operation, the video game system controls the execution of the native system application based on the third signal while the presenting of the media output continues on the display.

In an example, the mapping maintained by the video game system defines controlling the execution of the media application, controlling the execution of the native system application, and controlling the execution of the video game application. In an example, the execution of the instructions further causes the video game system to perform operations. In one operation, the video game system, prior to presenting the home screen output, receives a third signal from the first input device, the third signal corresponding to a fourth user input. In another operation, based on the mapping and responsive to the receiving the third signal, the video game system exits the video game application. In another example, the first input device is a remote control. The mapping maintained by the video game system indicates a state of a button of the remote control. The state is one of enabled or disabled and changes based on executed applications.

In an example, the execution of the instructions further causes the video game system to perform operations. In one operation, the video game system presents the media output in the foreground of the display. In another operation, the video game system receives a command from the second input device while the media output is in the foreground. In another operation, the video game system, based on the command, changes an aspect of the video game output while the presenting of the media output continues in the foreground.

A video game system is also described. The video game system includes a processor and a memory that stores instructions that, upon execution by the processor, cause the processor to perform operations which are disclosed herein above.

A non-transitory computer-readable storage medium that stores instructions is also described. The instructions, upon execution on a video game system, configure the video game system to perform operations disclosed herein above.

In an example, the non-transitory computer-readable storage medium is further configured to perform operations when the media output and a second media output are presented on the display. In one operation, the video game system presents on the display the media output based on the execution of the media application other than the video game application. In another operation, the video game system presents, in the foreground of the display, the second media output based on an execution of a second media application other than the video game application. In another operation, the video game system maintains a second mapping indicating that a second set of user inputs is used for controlling the execution of the second media application. In another operation, the video game system receives a second signal from the first input device, the signal corresponding to a a second user input of the second set. The video game system then launches a control center based on the second signal. In another operation, based on launching the control center, the video game system maintains a third mapping indicating that a third set of one or more user inputs of the plurality of user inputs is re-configured for controlling the execution of the media application. In this case, the third set comprises a subset of the second set. In yet another operation, the video game system receives a third signal from the first input device, the third signal corresponding to a third user input of the third set. In another operation, the video game system then determines, based on the third mapping, that the third signal corresponds to controlling the execution of the media application. The video game system then controls the execution of the media application based on the third signal while the presentation of the second media output continues in the foreground.

In an example, the mapping disclosed herein above further indicates that a toggle button of the first input device is configured to toggle a focus between the second media output and the media output. In an example, the non-transitory computer-readable storage medium is configured to perform further operations. In one operation, responsive to receiving a fourth signal from the toggle button to toggle the focus, the video game system generates the third mapping.

In an example, the mapping disclosed herein above further defines the controlling the execution of the media application and controlling the execution of the video game application. In one operation, prior to presenting the second media output, the video game system receives a fourth signal from the remote control, the fourth signal corresponding to a push of an exit button of the first input device. In another operation, responsive to the receiving the fourth signal and based on the mapping, the video game system exits the video game application.

Some embodiments of the present disclosure provide several technical advantages over current techniques for enabling user interaction with multiple concurrently executing applications on a computer system. Generally, existing computer systems do not allow users to provide concurrent inputs to multiple applications running at the same time ("concurrent user interaction"). If the user needs to switch to a different application (e.g., to control the application), the system necessitates a manual user input that causes the system to refocus to the different application. This system requirement may often provide an inconvenient user experience, especially if the user is engrossed in a particular activity in a given application (e.g., while playing a video game, switching focus to another music application to advance to the next song track). This problem grows more acute with an increasing number of user applications concurrently running on a given computer system. Another technical challenge is that there now exist multiple types of user devices (e.g., remote controllers, headsets, keyboards, etc.) that are capable of interacting with one or more applications on a computer system. By necessitating manual user input to switch focus from one application (which may be controlled by a one type of device) to another application (which may be controlled by another type of device) in order to enable user interaction, computer systems effectively limit efficiency and usefulness of each of these devices.

In contrast to existing computer systems, a first technical advantage of the present disclosure is that it provides a system and method that allows a user to concurrently interact with a plurality of applications executing on a computer system by not requiring the user to switch focus from one application to another when inputting commands to control an application. Additionally, the present disclosure allows multiple user input devices to be used concurrently to control applications on a computer system, thus improving the efficiency and usefulness of each of these devices.

A further understanding of the nature and the advantages of the embodiments disclosed and suggested herein may be realized by reference to the remaining portions of the specification and the attached drawings.

BRIEF DESCRIPTION OF THE DRAWINGS

FIG. 7 illustrates a table that provides an example mapping between applications being concurrently executed on the video game system, and button states and functions of a remote control, according to embodiments of the present disclosure.

DETAILED DESCRIPTION

Figure 1:
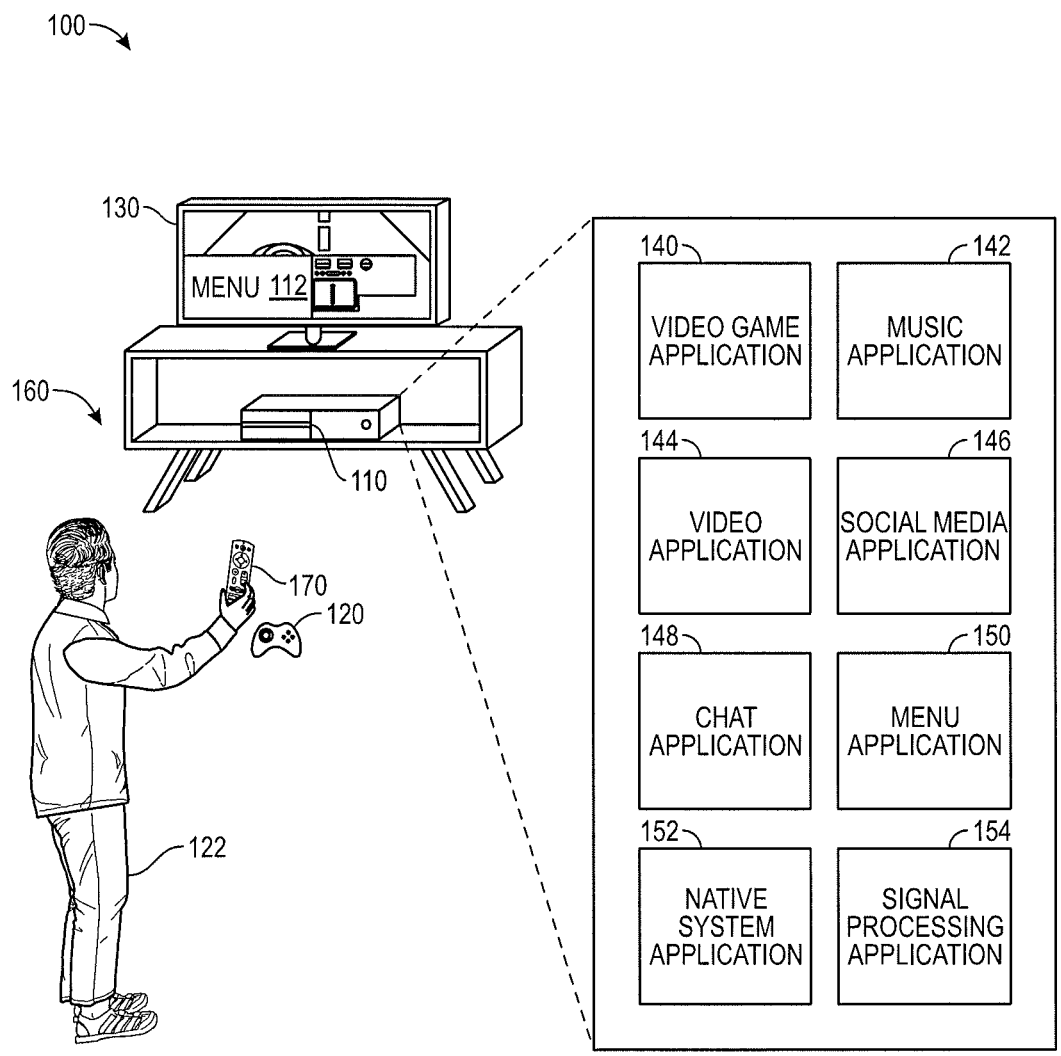
FIG. 1 illustrates an example of a computer system that utilizes a video game system to enable users to concurrently interact with multiple applications executing on the video game system, according to an embodiment of the present disclosure.

Generally, systems and methods for enabling concurrent user interaction with a plurality of applications executing on a computer system are described. Typically, the computer system may include a video game system (e.g., video game console, tablet, laptop, desktop computer, cloud-based gaming platform, or any other type of computing resource suitable for at least an execution of a video game), a remote control (e.g., handheld device, software application running on a mobile device, an optical system for gesture control, a speech system for natural language control, etc.), and a video game controller (e.g., hand controller, headset, joystick, software application running on a mobile device, an optical system for gesture control, a speech system for natural language control, etc.). The video game system may include one or more applications (e.g., video game application, music application, video application or other applications) that may be concurrently executing on the video game system. A first application may be displayed in a foreground of a display (e.g., GUI window containing the output is presented in an active layer). The video game system receives a signal from the remote control. The video game system processes the signal and outputs a command for controlling the presentation on the display of the output of a second application that is concurrently executing on the video game system. The command is executed while the output of the first application continues to be presented in the foreground of the display.

To illustrate, multiple use cases are described herein next. In a first use case, the first application is a video game application and the second application is a non-video game application. The video game application may generate an output that is displayed, for example, in a foreground of the display. The non-video game application may generate an output that is displayed in, for example, a background (e.g., GUI window containing the output is partially or fully hidden) of the display. With respect to the video game application, the video game output (e.g., the user's avatar in the game) is generated by the video game application and presented in a foreground of a display. Based on the video game output being displayed, the user may interact with the video game application by periodically using the video game controller to transmit commands (e.g., via Wi-Fi-based signals, infrared (IR) signals, Bluetooth signals, etc.) to the video game application. The video game application receives a command from the video game controller (e.g., via a signal processor of the video game system), and, based on the particular command received, executes a change in an aspect of the video game output (e.g., moving the user's avatar on the screen, adjusting a game setting, etc.).

Continuing with the first use case, while the video game output remains in the foreground of the display, the system may receive a user interaction (e.g., user input in the form of a signal) with the non-video game application (e.g., music application, video application) that is concurrently executing on the video game system and generating output. This user interaction may occur whether the output is presented in either the foreground (e.g., picture-in-picture (PIP)) or the background (e.g., audio feed with no GUI window displayed) of the display. More specifically, the system may receive the user interaction with the non-video game application that corresponds to a button push on the remote control, which transmits a signal (e.g., Bluetooth signals) to the non-video game application (e.g., via a signal processor application of the video game system). While the video game output remains in the foreground of the display, and, independent of whether the non-video game output is presented in the foreground or background of the display, the non-video game application may receive a command initiated by the user via the remote control. The non-video game application then, based on the particular command received, executes a change in an aspect of the non-video game output (e.g., fast-forwarding or rewinding through an audio track, pausing a video) while the video game output continues to be presented in the foreground of the display. As a result, the user can continue to interact with the video game without having to first switch the focus (e.g., bring to the foreground) to the other non-video game application, and still be able to use the remote control to control the non-video game application. When the system receives a user interaction corresponding to a button push on the remote control that is not associated with the particular non-video game application, the system may process the user interaction and determine that no command should be issued, and therefore does not output a command to control execution of the non-video game application.

In a second use case, based on input received from the push of a button of the remote control, the video game system may exit the video game application and execute a native system application. The native system application may generate a home screen output (e.g., home screen UI) that is presented in a foreground of the display. The native system application may, for example, receive user interaction via user input to the remote control that corresponds to browsing different media contents (e.g., video selections) or media apps (e.g., social media app, video applications, etc.) presented on the home screen UI. Meanwhile, similar to as described above, a non-video game application (e.g., video or music application) may also be concurrently executing on the video game system and presenting non-video game output on the display. In this use case, the video game system may receive from the remote control (and without first requiring a change of application focus) user input corresponding to controlling either the native system application or the non-video game application. For example, one or more buttons of the remote control may form a first set of a buttons that is mapped to operations for controlling the native system application. Meanwhile, one or more buttons of the remote control may form a second set of buttons (distinct from the first set) that is mapped to operations for controlling the non-video game application. While the home screen output remains being presented in the foreground, the video game system may receive a user interaction corresponding to a push of a button of the first set to control the execution of the native system application (e.g., using a direction pad button to navigate to a next video content on the home screen UI), independent of whether the non-video game output is presented in the foreground or background of the display. Moreover, the video game system may also receive a user interaction corresponding to a push of a button of the second set to control the execution of the non-video game application (e.g., fast-forward through a music track), even while the home screen output continues to be presented in the foreground of the display.

In a third use case, based on input received from the push of a button of the remote control, the video game system may exit the video game application described in the first use case above and launch a second non-video game application (e.g., video application) on the video game system, whereby the second non-video game application generates a second non-video game output (e.g., video feed) that is presented in the foreground (e.g., primary/main screen) of the display. The first non-video game application described in the first use case above may also be concurrently executing on the video game system and presenting non-video game output either in the foreground (e.g., PIP) or background (e.g., hidden from the display UI) of the display. In this example, one or more buttons of the remote control may form a first set of buttons that is mapped to operations for controlling the second non-video game application (e.g., selecting items presented within a GUI generated from the second non-video game output). The video game system may receive a user interaction corresponding to a push of a button of the first set to control the second non-video game application in a similar manner to as described above. Additionally, and while the second non-video game output remains being presented in the foreground, the video game system may receive a user interaction corresponding to a push of a button on the remote control that launches (or activates) a control center. Based on the activation of the control center, a subset (e.g., second set) of buttons of the first set may be reconfigured to control the execution of the first non-video game application (e.g., being formerly configured to control the execution of the second non-video game application). Subsequently, if the video game system receives a user interaction corresponding to a push of a button of the second set, the video game system will output a command that will be used to control the execution of the first non-video game application, even while the second non-video game output continues being presented in the foreground.

The above examples are provided for illustrative purposes. In the interest of clarity of explanation, the embodiments of the present disclosure may be described in connection with a video game system. However, the embodiments are not limited as such and similarly apply to any other type of a computer system. Generally, a computer system presents a GUI on a display. The GUI may include a home screen interface from which different applications of the computer system can be launched. Upon launching, the GUI may allow the user to interact with multiple applications via a remote control, even if the particular application being interacted with may be in the background of the display. Furthermore, although the embodiments of the present disclosure describe concurrent user interaction with specific combinations of applications being executed, the present disclosure may also apply to other combinations of applications, the particular combination of which may determine which remote control buttons are active (e.g., able to control the execution of a particular application) or inactive, and/or what function a remote control may be used to execute within the particular application. These and other embodiments are further described herein next.

FIG. 1 illustrates an example of a gaming environment that utilizes a computer system to enable users to concurrently interact with multiple applications executing on a video game system, according to an embodiment of the present disclosure. In FIG. 1, the gaming environment 100 includes a display 130 and a computer system 160 that is communicatively coupled to the display 130. The computer system 160 includes a remote control 170 (e.g., handheld remote control device), a video game controller 120 (e.g., headset, handheld controller), and a video game system 110 (e.g., video game console). The video game system 110 is communicatively coupled with the remote control 170 and the video game controller 120. The video game system 110 includes a computing environment that supports multiple types of applications 140-154 (e.g., video game application 140, music application 142, video application 144, etc.), whereby two or more of applications 140-154 may execute concurrently within the computing environment. Upon execution, one or more of the applications (e.g., applications 140-152) may each respectively generate an output that is presented on the display 130. Henceforth, as described in further detail below with regard to specific applications, and unless stated otherwise, the term "media application" will be used to refer to a specific type of application (e.g., applications 142-148) that generates media output (e.g., video feed, audio output, messaging window, text input window, menu, etc.) which is presented on the display 130 for user interaction, where the media application is neither a video game application 140, a menu application 150, a native system application 152, or a signal processing application 154. The video game system 110 can be a computer system dedicated for video games or a general purpose computer system, where such system can be a standalone system or a distributed system.

The video game system 110 receives a user interaction, for example, in the form of a signal emitted following the push of a button of the remote control 170 (or a button of the video game controller 120) to control the execution of one or more applications 140-152 executing on the video game system 110. In the case of a video game application 140, the video game application 140 generates a video game output (e.g., a representation of the activity within the game, game settings, other gaming controls, etc.). Upon the video game system 110 receiving a user interaction from the video game controller 120, the video game system 110 may process the user interaction and route a command to the appropriate video game application 140 executing on the system 110. The video game application 140 in turn may process the command and cause a change in an aspect of the video game output being presented on the display 130 (e.g., moving the user's 122 avatar on the display 130 from one position to another).

In the case of media applications (e.g., media applications 142-148), the execution of the media application may be controlled by the video game system 110 upon receiving a signal that corresponds to the pushing of a button on the remote control 170. The video game system 110 may receive and process the signal, and route a controlling instruction (e.g., command) corresponding to the signal to the appropriate media application (e.g., music application 142). The media application in turn may process the controlling instruction and cause a change in an aspect of the media output (e.g., skipping to the next song track being played by the music application 142). It should be understood that media applications 142-148 provide only a representative (not exhaustive) list of applications suitable to perform the embodiments disclosed herein. In some embodiments, the receiving of a signal from the remote control 170 or video game controller 120, processing the signal, and/or routing a command to control the execution of an application may be performed by a signal processing application 154, as described further below.

In embodiments discussed below, although the video game controller 120 is used to control the video game application 140, and the remote control 170 is used to control media applications 142-148, the menu application 150, and the native system application 152, it should be understood that the use of this type of scenario should not be construed to pose a limitation on the scope of the disclosure. For example, the video game controller 120 could be configured to control other media applications 142-148. Furthermore, the video game controller 120 and the remote control 170 could be integrated into a single device.

Although in FIG. 1, the video game controller 120 is depicted as a handheld game controller, it should be understood that other types of video game controllers may be used as a suitable video game controller 120. Generally, the video game controller 120 is an example of an input device configured to control a video game application. Other types of input devices are possible, including, but not limited to, a joystick, steering wheel, mouse and keyboard, gamepad, headset, a mobile device (e.g., smartphone, tablet computer, etc.) hosting a control application, an optical system that includes optical sensors and processors to monitor user gestures, a speech system including microphones and processors to process natural language utterances, or any other user device or input/output device. The video game controller 120 may be coupled to the video game system 110 either by wireless or wired connection using any suitable communication medium and protocol (e.g., IR, Bluetooth, a wire or cable, fiber optics, a telephone line, a cellular link, a radio frequency (RF) link, a WAN or LAN network, the Internet, or any other suitable medium).

Furthermore, although the remote control 170 depicted in FIG. 1 may be a dedicated electronic device, it should be understood that other types of remote controls may be used as a suitable remote control. Generally, the remote control 170 is an example of an input device configured to control a media application. Other types of input devices are possible, including, but not limited to, a mobile device (e.g., smartphone, tablet computer, etc.) hosting a control application, whereby this application may be configured to enable virtual buttons that cause a signal to be transmitted from the mobile device to the video game system 110. Other types of user device include an optical system that includes optical sensors and processors to monitor user gestures, a speech system including microphones and processors to process natural language utterances, or any other user device or input/output device. Although typically, and as discussed FIG. 2 and subsequent illustrations, the remote control 170 will transmit signals over a wireless medium (e.g., IR, Bluetooth), the use of this type of embodiment below should not be construed to pose a limitation on the scope of the disclosure. For example, the remote control 170 could be directly connected to the video game system 110 via an extended Ethernet cable or any other suitable medium. Furthermore, button pushes are one example of user inputs to control a media application. Other types of the user inputs can be possible, depending on the type of the user device used for the control. For instance, for a mobile device hosting a control application, the mobile device can present soft buttons (e.g., actionable objects displayed on a GUI) and suitable user inputs for the controls include clicks, finger taps, or finger gestures that involve the soft buttons. In another illustration, for an optical system that tracks user gestures, such gestures represent user inputs. In yet another illustration, for a speech system that processes natural language utterances, such utterances are the user inputs.

In some embodiments, the display 130 may be any suitable device that is capable of displaying output from an application to a display device. This includes, but is not limited to, television (TV) sets or video monitors of various types (e.g., plasma, liquid crystal display (LCD), organic light-emitting diode (OLED), cathode ray tube (CRT), etc.) which are capable of displaying a video output. In some embodiments, the display 130 includes a speaker that receives an audio signal from the video game system 110 (which may correspond to audio output from a music application 142) and converts the audio signal into corresponding sound. The speaker (not shown in FIG. 1) may be built into the display device 130 or may be a separate device that is connected (e.g., wireless or wired) to the display 130. In some embodiments, the display 130 may further include (e.g., built-in to the TV or connected to a separate device) other components (not shown) that may be used to present a media output. This may include, for example, other video monitors or televisions that are configured to present a mosaic display (e.g., a seamless image project over multiple video monitors). In another example, the display 130 may also include components from a headset device that is configured to present a visual image, audio output, or tactile feedback to a user 122.

In some embodiments, and as described above, the video game system 110 may be a standalone video game console. It should be understood that, although the embodiments below discuss the video game system 110 implemented in a video game console 110, the present disclosure is not limited to such embodiment. As an example, in other embodiments, the video game system 110 may be implemented as a cloud-based video game system, such that some components of the system 110 (e.g., involved in processing media output or video game output) are implemented in the cloud. In one embodiment, the video game system 110 may include at least one memory, one or more processing units (or processor(s)), and one or more communications devices, among other components. The processor(s) may be implemented as appropriate in hardware. The communications device may be configured to communicate with the remote control 170 or the video game controller 120 using any suitable communication path. In one embodiment, the communications device may be configured to send or receive IR and/or Bluetooth signals from the remote control 170 and/or the video game controller 120. In an example, the communications device may receive a Bluetooth signal transmitted from the remote control 170, and convert the Bluetooth signal to a digital output for further processing by the signal processing application 154 (discussed below). The communications device may also be configured to connect to the Internet via any suitable medium. It should be understood that the video game console may include one or more communications devices to accomplish the functions described above.

The memory may store program instructions that are loadable and executable on the processor(s), as well as data generated during the execution of these programs. Depending on the configuration and type of video game system 110, the memory may be volatile (such as random access memory (RAM)) and/or non-volatile (such as read-only memory (ROM), flash memory, etc.). In some implementations, the memory may include multiple different types of memory, such as static random access memory (SRAM), dynamic random access memory (DRAM) or ROM. The video game system 110 may also include additional storage (not shown), such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices.

Turning to the contents of the memory in more detail, the memory may include an operating system. The operating system may provide executable program instructions for the general administration and operation of video game system 110 (e.g., including executing and managing the various applications 140-154) and typically will include a computer-readable storage medium (e.g., a hard disk, random access memory, read only memory, etc.) storing instructions that, when executed by a processor of the video game system 110, allow the video game system 110 to perform its intended functions. Suitable implementations for the operating system are known or commercially available and are readily implemented by persons having ordinary skill in the art, particularly in light of the disclosure herein.

In some embodiments, the memory includes one or more applications for implementing the features disclosed herein, including a video game application 140, media applications 142-148, a menu application 150, a native system application 152, and a signal processing application 154. In one embodiment, the signal processing application 154 may receive digital output from the communications device of the video game system 110, and route the digital output to the appropriate application. More specifically, and in one example embodiment, the signal processing application 154 may be configured to recognize the digital output (e.g., a data packet) as being formatted according to the Bluetooth Audio/Video Control Transport Protocol (AVCTP). As such, the signal processing application 154 may determine, based on one or more headers of an AVCTP packet, the application to which to route the data packet (e.g., the application that a particular command embedded in the data packet is intended to control). Similarly, the signal processing application 154 may also be configured to interpret digital output from IR signals (e.g., according to any suitable IR protocol, including, but not limited to, the Sony SIRC IR protocol). In some embodiments, the signal processing application 154 may be implemented as a hardware or software function within the communications device described above.

As mentioned above, the media applications may include, but are not limited to, a music application 142, a video application 144, a social media application 146, and a chat application 148. Similar to the video game application 140 described above, the media applications 142-148 may each generate distinct media outputs. A particular media application may receive user interaction to control the media application's execution (e.g., via a signal transmitted by the remote control 170 and received by the communications device, whereby a command is generated and routed to the media application by the signal processing application 154), which in turn may cause the media application to change an aspect of the media output being generated by that media application and presented on the display 130. For example, as described above, the music application 142 may generate a media output in the form of an audio output channel. In some embodiments, the music application 142 may also generate media output in the form a presenting a video output channel (e.g., GUI) on the display 130. The music application 142 may receive a user interaction via the remote control 170 that corresponds to a selection of a GUI element of the video output channel (e.g., selecting a particular sound track, adjusting the speed of the audio output being presented on the display 130). A video application 144 may similarly generate a type of media output in the form of a video output channel and an audio output channel (e.g., a movie, live streamed video, etc.) that is presented on display 130. In a similar way as described above, the video game system 110 may receive a user interaction with the video application 144 (e.g., fast-forwarding or rewinding through scenes in the movie). The video game system 110 may also receive user interactions with other applications, such as the social media application 146 and the chat application 148, via similar mechanisms as described above. In some examples, these user interactions may control the media applications such as, but not limited to, inputting text characters, selecting from a menu, navigating through media contents, adjusting settings within the media application, etc.).

In some embodiments, the memory also includes a menu application 150. The menu application 150 may output a menu 112 GUI (e.g., dashboard, also may be called a "control center") to be presented on the display 130. In some embodiments, the menu application 150 may be activated by the video game system 110 upon receiving a signal corresponding to the pushing of a button on the remote control 170. In an example, once activated, the menu 112 may appear over at least a portion of a media output from a media application 142-148 (or a video game output from a video game application 140), such that the menu 112 is presented in the foreground of the GUI on the display 130. The menu 112, in an example and as discussed further in reference to FIG. 6 below, may allow the video game system 110 to receive a user input to switch the focus (e.g., via the remote control 170) to a particular media application concurrently executing on the video game system 110 (e.g., presenting in PIP), or navigate to different applications or screens (e.g., user experiences) within the video game system 112.

In some embodiments, the memory also includes a native system application 152. The native system application 152 may output home screen output (e.g., a home screen user interface (UI)) to be presented on the display 130. In some embodiments, the native system application 152 may be activated by the video game system 110 upon receiving a signal corresponding to the pushing of one or more buttons on the remote control 122. In an example, the video game system 110 may first activate the menu 112, determine that an item in the menu 112 has been selected, and then present the home screen UI based on the selection (whereby each video game system 110 action is performed upon receiving a particular signal from the remote control 170). Following the presenting of the home screen UI, the video game system 110 may receive signals corresponding to user inputs to browse through different media applications, and/or select a particular media application to launch. In another example, the video game system 110 may receive signals corresponding to user inputs to browse through different media contents (e.g., movie selections recently played) and select a particular movie, which may in turn cause a video application 144 to be launched and present the movie content on the display 130.

As described above, two or more of the applications 140-152 may execute concurrently on the video game system 110. Each of the applications may respectively generate an output that is presented on the display 130. In an example, the video game application 140 may generate a video game output that is presented on the display 130. The video game output, itself, may include different types of video game output channels (e.g., video output channel, audio output channel, tactile feedback output channel, etc.), and each type of output channel may be presented on a component (e.g., connected device) of display 130 (e.g., a video monitor component, a speaker component, etc., as described above). Similarly, a media application of media applications 142-148 may generate a media output, and the media output for that application may include media output channels, which may be, in turn, presented on the display 130. When two or more applications generate output at substantially the same time, and the outputs share a common channel type, the output channels may be provided as input to a rendering process. This rendering process may receive two or more output channels from different applications as input, and, utilizing a rendering algorithm, generate a composite output that is then presented on display 130. As an example, two or more video output channels may be received as input (e.g., from a first video application 144 and a second video application 144) by a rendering process, which may in turn generate a composite output such that one video output channel is presented as a main (e.g., primary) window of display 130, and the other video output is presented within the main window (e.g., secondary window, PIP). Other suitable video rendering techniques (e.g., blending, transparency) are well known and may be used to implement embodiments described herein. Similarly, two or more distinct audio output channels generated by separate applications (e.g., video game application 140 and music application 142) may be provided to a rendering process that may generate a composite audio, which is then presented on display 130. In one example, the composite audio may be presented on the display 130 such that the video game audio output channel is presented at a lower decibel level on a speaker component of display 130 than the audio output channel of the music application. In this way, two different application outputs (e.g., video game output and media application output) and their respective channel output components may be presented to the display 130 at substantially the same time via a rendering process.

In some embodiments, the rendering process that generates a composite output from two input channels may cause one output channel to be presented in a foreground of the display 130, and another output channel to be presented in a background of the display 130. As discussed herein, presenting output in the foreground of the display 130 may refer to causing the output to be presented in an active layer of display 130 that reflects that the user's 122 focus is on that layer. As an example, a video composite output presented on display 130 may include one window (representing a first video output from a first media application) that overlays another window (representing a second video output from a second media application). In this case, the overlaying window is presented in an active layer and thus is in the foreground of the display, while the other window is in the background. Another example where an application is presented in a background may be when the application generates output (e.g., presented to a speaker component of the display 130), but any video output from the application (e.g., music application 142) is not presented visually on the display 130. It should be understood that there may be other ways of representing an output as being in the foreground (e.g., highlighting the perimeter of a window, movement of a cursor within a window, etc.). It should also be understood that two different applications may both be in the foreground at the same time. For example, in a PIP configuration, both the output displayed in the full screen of display 130 and the output displayed in an inset window (e.g., PIP) may be presented in an active layer, and thus both be in the foreground.

As will be discussed further in embodiments below, one technical advantage the present disclosure is that it enables concurrent user interaction with concurrently executing applications. Specifically, and for example, even though an application may generate output that is presented in the background (while another application presents in the foreground), the video game system 100 may still receive user input corresponding to controlling the execution of the background application (and thus the output of the background application being presented) even while the foreground application continues presenting in the foreground. In another example, two applications may both be presenting in the foreground (e.g., one in PIP). The video game system 100 may receive user interaction (e.g., a signal corresponding to user input) corresponding to controlling the execution of the application presenting in the PIP window (e.g., video application 144), even while the video game system 100 may also continue to receive user input corresponding to controlling the execution of the application presenting in the main screen window (e.g., video game application 140).

Figure 2:
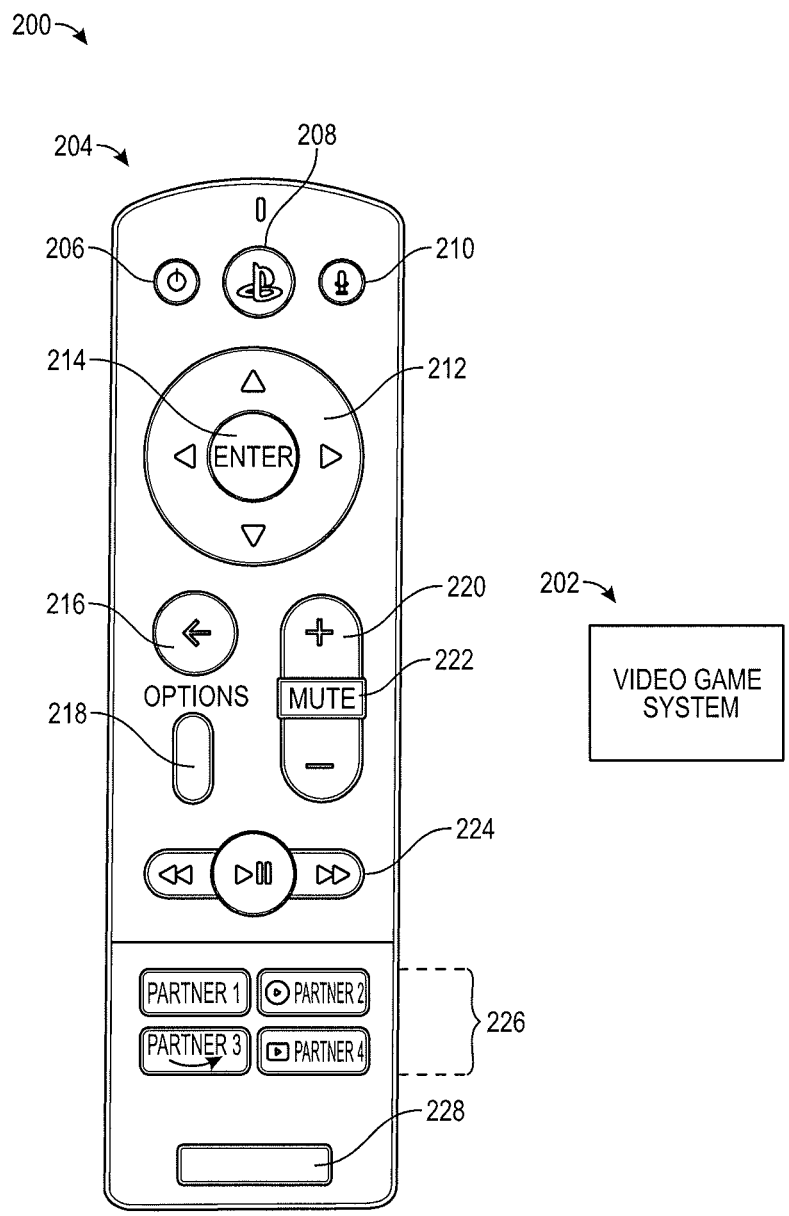
FIG. 2 illustrates a remote control of the computer system which emits a signal that is transmitted to the video game system, according to an embodiment of the present disclosure.

FIG. 2 is a system diagram 200 that illustrates components of a computer system in further detail, according to an embodiment of the present disclosure. In system diagram 200, a remote control 204 (which may correspond to remote control 170 of FIG. 1) and a video game system 202 (which may correspond to video game system 110 of FIG. 1) of computer system 160 are depicted. In one embodiment, the remote control 204 includes a plurality of buttons 206-228. Upon the pushing of a button of the remote control 204, the remote control 204 emits a signal that is transmitted to the video game system 202. As described below, the type of signal that is emitted by the pushing of a button may depend on the particular button of the remote control 204 that is pushed. For example, one button may emit an IR signal when pushed, while another button may emit a Bluetooth signal when pushed. In some embodiments, the video game system 202 is within a field of view of the remote control 204 in order for the communications device of the video game system 202 to detect the particular signal. In some embodiments, the pushing of a particular button (e.g., button 220, button 222) may emit a signal that is intended to control another device that is not the video game system (e.g., the display 130).

As discussed above, in one embodiment, remote control 204 may contain a plurality of buttons 206-228. A power button 206 may be used to turn the video game system ON/OFF by emitting an IR signal. A home button 208 may be used to activate a menu 112 GUI (e.g., control center) by emitting a Bluetooth signal. In some embodiments, a user 112 may also use the home button 208 to activate the native system application 152 to present the home screen UI. A voice control button 210 may be used to execute various commands via a user's 112 voice by emitting a Bluetooth signal. In some embodiments, the voice control button 210 may be used to, for example, launch an application, navigate the system (e.g., via the home screen UI), search for system contents, or virtually push another button of the remote control 204 to control the execution of a particular application. A directional pad 212 may be used to navigate within a particular GUI presented on the display 130 by emitting a Bluetooth signal. In an example, the directional pad may be used to navigate within the menu UI 112. An enter (or "select") button 214 may be used to select an item presented on the display by emitting a Bluetooth signal. In an example, the enter button 214 may be used to select an option on the menu UI 112, or launch an application from the home screen UI. A back (or "cancel") button 216 may be used to navigate to a previous screen or selection by emitting a Bluetooth signal. An options button 218 may be used to present a menu of settings which the user can configure for a particular application (e.g., native system application 152) by emitting a Bluetooth signal. A volume control button 220 may be used to control the volume on the display 130 by emitting an IR signal. A mute button 222 may be used to mute the volume on the display 130 by emitting an IR signal. A media transport controls button 224 may be used to control a media application (e.g., music application 142, video application 144) by adjusting an aspect of the media output being presented to the display 130 (e.g., fast-forwarding or rewinding through music content or video content, pausing/playing content) by emitting a Bluetooth signal. One or more partner application launch buttons 226 may be used to launch a particular third-party media application by emitting a Bluetooth signal. In an example, a "Partner 1" application button 226 may be used to launch a "Partner 1" video application 144. A partner custom feature button 228 may be used to control a particular aspect of execution of a third-party application (e.g., "Partner 1" application) by emitting a Bluetooth signal. In an example, partner custom feature button 228 may be used to purchase a particular media content that is currently being presented by a third-party application. It should be understood that, as discussed further below, the particular functionality of the partner custom feature button 228 may vary, depending on which third-party application is currently executing.

More generally, and as described below in reference to subsequent FIGS. 3-7, whether or not a particular button of the remote control 204 is enabled/disabled, which application the pushing of the particular button controls, and what function is executed by pushing the button, may be determined based on which applications are concurrently presenting output on the display 130, and the manner in which the applications are presented on the display (e.g., main screen, PIP). It should further be understood that, although specific characteristics (e.g., functions, protocol (e.g., IR/Bluetooth)) of each button of remote control 204 have been described above, any suitable configuration of buttons may perform embodiments of the present disclosure. Moreover, as mentioned above, the remote control 204 need not be a standalone hardware unit, but in fact the buttons and/or functions of the remote control may be implemented in software executing on another device (e.g., mobile phone).

Figure 3:
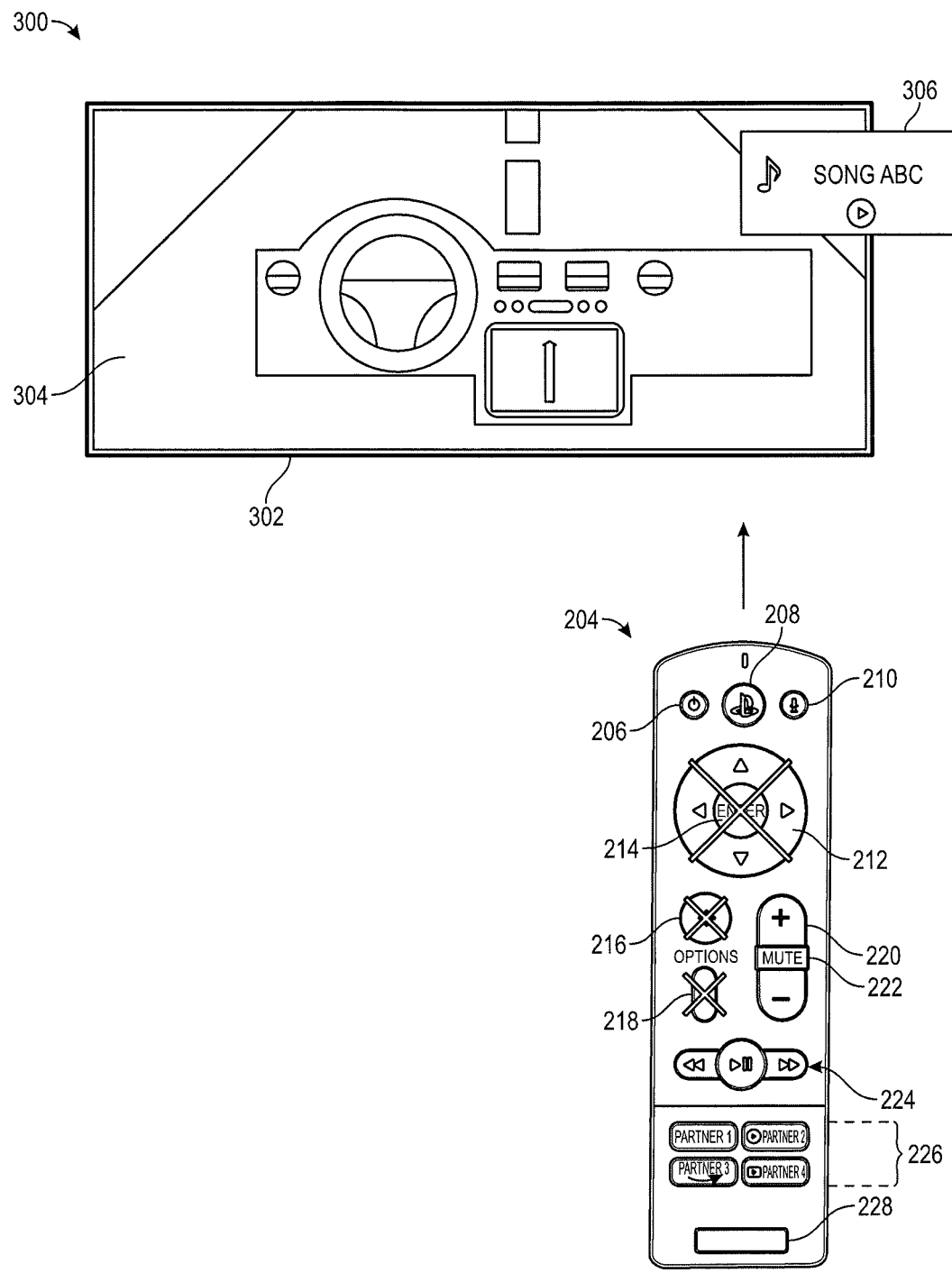
FIG. 3 illustrates a remote control of the computer system that is used to control a media application that is running in the background, according to an embodiment of the present disclosure.

FIG. 3 is a system diagram illustrating a remote control of the computer system that is used to control a media application that is running in the background, according to an embodiment of the present disclosure. In system diagram 300, a display 302 (which may correspond to display 130 of FIG. 1) and a remote control 204 are depicted. In one embodiment, the video game system 110 is executing a video game application 140 that generates a video game output 304, which is presented in the foreground of the full ("main" or "primary") screen of display 302. The video game system 110 may receive a signal that corresponds to a user input (e.g., push of a button) at the video game controller 120, as described above. Meanwhile, a music application 142 concurrently executing on the video game system 110 generates a media output in the form of music output 306. In this embodiment, depicted by the music output 306 partially protruding from the display 302, the music output 306 is presented on display 302 in the background. More specifically, and for example, the audio output channel of the music output 306 displays on a speaker of display 302, while any GUI (e.g., list of music tracks queued) corresponding to a video output channel of the music output 306 is not presented on the display 302. As discussed above, an audio output channel of the video game output 304 and the audio output channel of the music output 306 may be provided as input to a rendering process that produces a composite audio output, which is the presented on the display 302. In one example, the audio output corresponding to the video game output 302 is played at a reduced volume, so that the user 122 can better hear the music being played.

Turning to the behavior when a button of remote control 204 is pushed during the activities described above in reference to FIG. 3, the video game system 110 may store a mapping in memory between specific combinations of applications concurrently executing (and how each application presents output on display 130), and the resulting behavior that occurs when a button is pushed. Based on this mapping in memory, the video game system 110 performs the resulting behavior according to the mapping. For clarity of explanation, before describing the specific behavior of remote control 204 in the embodiment described above in reference to FIG. 3, it is helpful to introduce FIG. 7 and Table 1 (below) for assistance in describing the embodiments of FIGS. 3-6.

FIG. 7 illustrates a table 700 that provides an example mapping between concurrently executing applications (e.g., video game application 140, media applications 142-148, native system application 152) on a video game system 110, and button states and functions of a remote control 204, according to embodiments of the present disclosure. In some embodiments, the video game system 110 maintains in memory (or storage) a data structure (e.g., table, array, etc.) which includes several columns. In one embodiment, as described further below, columns 702-706 (primary application 702, secondary application 704, button 706) represent the parameters that define a unique scenario. Based on the unique scenario, the video game system 110 determines the specific behavior (specified in columns 710-714 as button state 710, application controlled 712, control function example 714) when receiving a signal corresponding to a push of a particular button (specified in column 706) of remote control 204.

In an example, the video game system 110 receives a signal from the remote control 204. A system application (e.g., signal processing application 154, rendering process, etc.) may then determine which applications are concurrently executing and generating output (e.g., video game output, media output) that is being presented on the display 130. The system application may further determine whether a particular application is presenting output on the full screen (e.g., "main screen application", or "primary application"), corresponding to column 702, or presenting as a secondary screen application (corresponding to column 704). In an example, a secondary screen application (or "secondary application") may be an application that is presenting output in the background. In another example, a secondary screen application may be presenting output in a PIP display. Based on these parameters, the system application may determine several factors regarding how to process the signal. First, for the given primary application-to-secondary application pairing, the system application may determine, based on the mapping, which buttons of remote control 204 are enabled and which are disabled. In some embodiments, the mapping maintained by the table includes grouping the buttons that are enabled into a set. In one embodiment, the video game system 110, following a determination of whether a button is enabled/disabled, may process the received signal, and, if the button is enabled, output and route a command to the appropriate application without further action. If the button is disabled, the video game system 110 may determine not to output a command and accordingly take no further action. In other embodiments, however, beyond routing a command to the appropriate application if the button is enabled (or not routing if the button is disabled), the video game system 110 may transmit one or more signals back to the remote control 204, which may further cause the remote control 170 to perform one or more operations according to whether a particular button is enabled or disabled. In one embodiment, the video game system 110 may transmit a signal to the remote control 204 which causes the remote control 204 buttons to turn button lights on or off. For example, an enabled button light might be turned on, while a disabled button light may be turned off. In another embodiment, a light color may change according to whether the button is enabled or disabled (e.g., blue for enabled, red for disabled). In another embodiment, for a software-based remote control application 204 implemented on a mobile device, disabled buttons may be greyed out (e.g., non-selectable) or removed from the GUI. In yet another embodiment, involving a mechanical remote control 204 with physical buttons, upon a receiving a signal from the video game system 110, the remote control 204 may lock a button that is disabled so that the button cannot be pushed. In some embodiments, any suitable mechanism may be implemented that causes the remote control 204 to provide an indication about whether the button is disabled or enabled.

Second, based on the pairing of applications executing, the system application may determine which application of the two (primary application, secondary application) are controlled by the pushing of the particular button. Third, based on the pairing of applications executing and the specific application (e.g., "Partner 1" 226, being a type of video application 144) running, the system application may determine the specific controlling function that the application will execute (which may change an aspect of the output being presented to the display 130). In an example, video application 1 may be configured such that, when fast-forwarding or rewinding video content via the media transport controls button 224, the application adjusts the video output in increments of 10 seconds forward or backward (as shown in row 3, column 714). In contrast, video application 2 may be configured such that, when fast-forwarding or rewinding video content via the media transport controls button 224, the application adjusts the video output in increments of 30 seconds forward or backward (as shown in row 4, column 714).

Table 1 below corresponds to one embodiment of a mapping between concurrently executing applications on video game system 110, and button states and functions of a remote control 204, providing more scenario examples than are depicted in FIG. 7. It should be understood Table 1's mapping is not a comprehensive mapping of all possible scenarios, but only representative to illustrate a wider variety scenarios that are suitable to enable embodiments of the present disclosure. Any suitable mapping, including different permutations and combinations than the scenarios in Table 1 or FIG. 7, may be sufficient to enable the embodiments of the present disclosure. FIGS. 3-6 may refer to FIG. 7 and/or Table 1 interchangeably to further describe the embodiment depicted in each figure.

TABLE 1

| | Scenario Parameters | | | Resulting State & Function Output | | |
| --- | --- | --- | --- | --- | --- | --- |
| | Primary | | | | | |
| Row ID | (Main screen) app | Secondary app | Button | Button State | App controlled | Control function example |
| 1 | Video game | Audio 1 | Media transport controls 224 | Enabled | Secondary | FFWD/RWD: +/−5 seconds Play/Pause |
| 2 | Video game | Audio 2 | Media transport controls 224 | Enabled | Secondary | FFWD/RWD: Next/Prev, track Play Pause |
| 3 | Video game | Video 1 | Media transport controls 224 | Enabled | Secondary | FFWD/RWD: +/−10 seconds Play/Pause |
| 4 | Video game | Video 2 | Media transport controls 224 | Enabled | Secondary | FFWD/RWD: +/−30 seconds Play/Pause |

TABLE 1-continued

| | Scenario Parameters | | | Resulting State & Function Output | | |
|---|---|---|---|---|---|---|
| | Primary | | | | | |
| Row ID | (Main screen) app | Secondary app | Button | Button State | App controlled | Control function example |
| 5 | Home Screen UI | Audio/Video media app (e.g., Video 1) | Media transport controls 224 | Enabled | Secondary | FFWD/RWD: +/−10 seconds Play/Pause |
| 6 | Video 2 | Video 1 | Media transport controls 224 | Enabled | Main | FFWD/RWD: +/−30 seconds Play/Pause |
| 7 | Video 2 | Video 1 | Media transport controls 224 | Enabled | Secondary (using Control Center) | FFWD/RWD: +/−10 seconds Play/Pause |
| 8 | Any | Any | Power On/Off 206 | Enabled | n/a | System turns on/off |
| 9 | Any | Any | Home 208 | Enabled | n/a | If off, turn on system; If on, activate menu GUI. |
| 10 | Video game | Non-video game media app (e.g., Video 1) | Voice Control 210 | Enabled | Secondary | Launch app, or use transport controls |
| 11 | Home Screen UI | Non-video game media app (e.g., Video 1) | Voice Control 210 | Enabled | Secondary or Main | Launch app, system navigation (main), or use transport controls (secondary) |
| 12 | Non-video game media app (e.g., Video 1) | Video 2 | Voice Control 210 | Enabled | Main | Launch app, system navigation, transport controls (main) |
| 13 | Video game | Audio/Video media app (e.g., Video 1) | Directional Pad 212 | Disabled | n/a | n/a |
| 14 | Home screen UI | Audio/Video media app (e.g., Video 1) | Directional Pad 212 | Enabled | Main | Navigate home screen |
| 15 | Non-video game media app (e.g., Chat 1) | Video 1 | Directional Pad 212 | Enabled | Main | Navigate non-video game media app |
| 16 | Video game | Audio/Video media app (e.g., Video 1) | Enter/Select 214 | Disabled | n/a | n/a |
| 17 | Home screen UI | Audio/Video media app (e.g., Video 1) | Enter/Select 214 | Enabled | Main | Select item on home screen |
| 18 | Non-video game media app (e.g., Chat 1) | Video 1 | Enter/Select 214 | Enabled | Main | Select item in non-video game media app |
| 19 | Video game | Audio/Video media app (e.g., Video 1) | Back/Cancel 216 | Disabled | n/a | n/a |
| 20 | Home screen UI | Audio/Video media app (e.g., Video 1) | Back/Cancel 216 | Enabled | Main | Navigate home screen |
| 21 | Non-video game media app (e.g., Chat 1) | Video 1 | Back/Cancel 216 | Enabled | Main | Navigate non-video game media app |
| 22 | Video game | Audio/Video media app (e.g., Video 1) | Options 218 | Disabled | n/a | |

TABLE 1-continued

| | Scenario Parameters | | | Resulting State & Function Output | | |
|---|---|---|---|---|---|---|
| Row ID | Primary (Main screen) app | Secondary app | Button | Button State | App controlled | Control function example |
| 23 | Home screen UI | Audio/Video media app (e.g., Video 1) | Options 218 | Enabled | Main | Configure home screen |
| 24 | Non-video game media app (e.g., Chat 1) | Video 1 | Options 218 | Enabled | Main | Configure non-video game media app |
| 25 | Any | Any | Volume Control 220 | Enabled | n/a | Control TV volume |
| 26 | Any | Any | Mute 222 | Enabled | n/a | Mute TV volume |
| 27 | Video Game | Non-video game media app | Partner App Launch 226 | Enabled | Main and Secondary | Exit video game; pause secondary; launch partner app in main. |
| 28 | Video 1 | Video 2 | Partner Custom Feature 228 | Enabled | Secondary | Purchase video content playing |
| 29 | Video 1 | Video 2 | Partner Custom Feature 228 | Enabled | Secondary | Save video content to favorites |

Returning to FIG. 3, the video game system 110 may maintain a mapping in memory similar to the mapping described in Table 1 and FIG. 7. As described above in FIG. 3, a video game application 140 is executing and presenting video game output in the main screen of display 302. Furthermore, the music application 142 is concurrently generating media output (e.g., audio output) and presenting in the background of display 302. In an example, with this specific combination of applications presenting output, a subset of the total number of buttons of remote control 204 may be enabled, and the remaining buttons may be disabled. As depicted in FIG. 3 (e.g., with an "X" over the button signifying that it is disabled), directional pad button 212, enter button 214, back/cancel button 216, and options button 218 are included in a set of disabled buttons. (For reference, this may correspond, respectively, to Table 1, rows 13, 16, 19, and 22). In some embodiments, as described above, when a signal corresponding to a disabled button is received, the video game system 110 may transmit a return signal to the remote control 204, which may further cause the remote control 204 to light up buttons that are currently disabled.

The video game system 110 may receive a signal corresponding to the push of a button of the set of enabled buttons, which may, in an example, correspond to the media transport controls button 224. Referring back to the mapping table 700 of FIG. 7 (and Table 1), this scenario and the expected resulting functional output is illustrated by row 1 and/or row 2, depending on which specific music application 142 is executing. In either scenario depicted by row 1 or row 2, the music application 142 (not the video game application 140) is the application that is controlled by the remote control 204. In one example, depicted by row 1, if music application 142 ("Audio 1") is executing, then the pushing of the media transport controls button 224 may either result in fast-forwarding or rewinding an audio track in increments of 5 seconds. The button 224 may also be used to play or pause the audio output being presented. In another example, depicted by row 2, if music application 142 ("Audio 2") is executing, then the pushing of the media transport controls button 224 may result in moving to the next/previous audio track. Similar to row 1, the button 224 may also be used to play or pause the audio output being presented.

Beyond the media transport controls button 224, there may be several other buttons that are also enabled. As an example, in reference to the scenario depicted in FIG. 3, and as shown in Table 1, the power button 206 (row 8), home button 208 (row 9), the voice control button 210 (row 10), the volume control button 220 (row 25), the mute button 222 (row 26), the partner application launch button 226 (row 27), and the partner custom feature button 228 (row 28/29) may all remain in the enabled set of buttons. Each button may have any suitable behavior, for example, as described above. Note further that, for any of the embodiments described in FIGS. 3-6, any suitable mapping to which buttons are enabled or disabled, and what application the enabled buttons control, may be used to implement embodiments of the present disclosure.

It should be understood that a technical advantage of the present disclosure is that the user 122 may be able to concurrently interact with the video game application 140 (e.g., issuing commands via the video game controller 120, and/or watching the video game output presented in the main screen) while interacting with the music application 142 with the remote control 204. In other words, the video game system 110 does not need to first change the display's 302 focus to the music application 142 in order to receive and process a signal from the pushing of a button of remote control 204 corresponding to controlling the execution of the music application 142. It should further be understood that, although the scenario depicted in FIG. 3 does not illustrate any video output channel of the music output 306 being presented on display 302, the present disclosure should not be construed to be so limiting. In an example, and as described above, the music application 142 may additionally present video output as a secondary application via GUI in a PIP display, while still receiving and processing a signal from the pushing of a button of the remote control 204 corresponding to controlling the execution of the music application 142.

Figure 4:
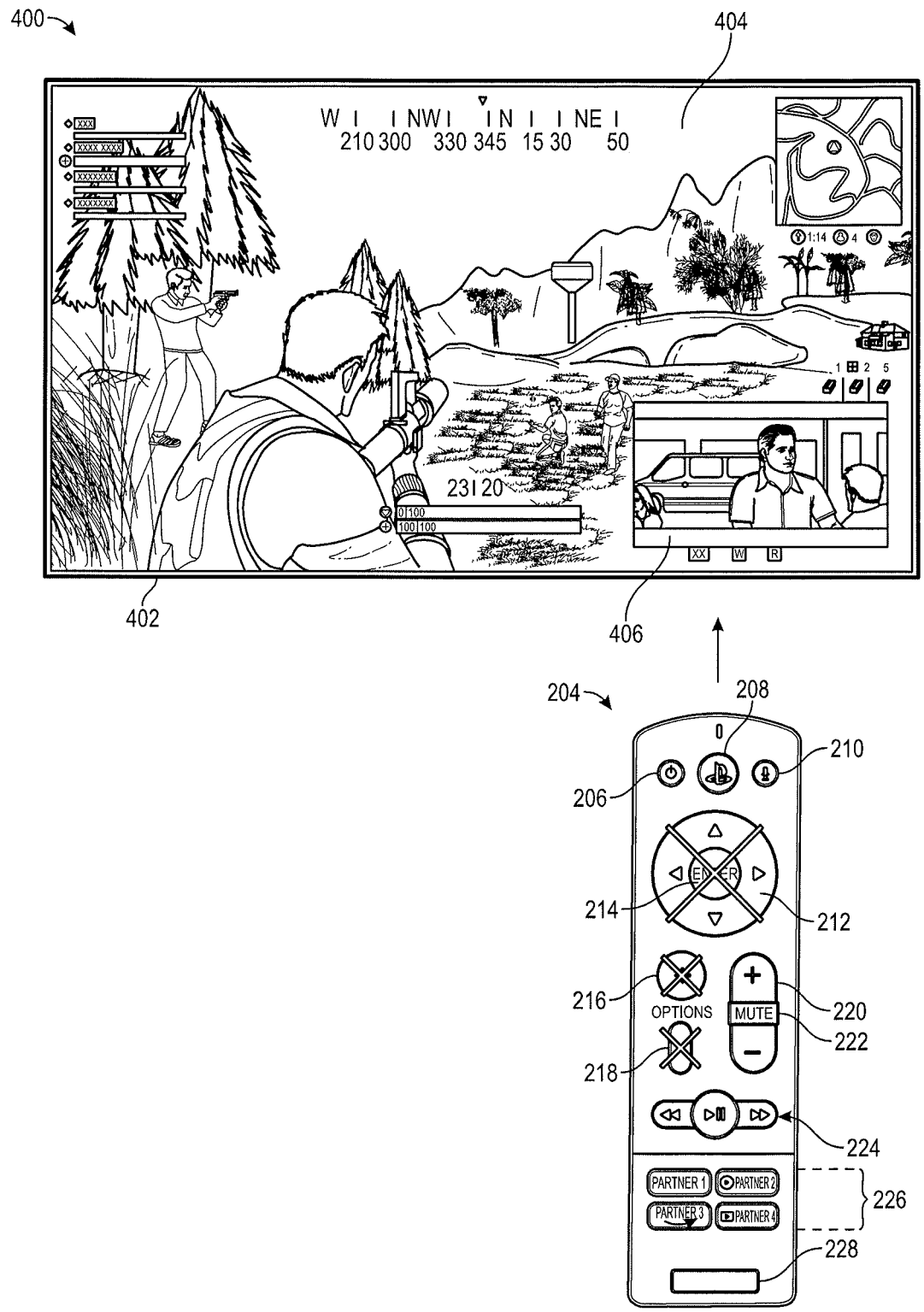
FIG. 4 illustrates a remote control of the computer system that is used to control a media application that is running in the foreground, according to embodiments of the present disclosure.

FIG. 4 is a system diagram illustrating a remote control of the computer system that is used to control a media application that is running in the foreground, according to embodiments of the present disclosure. In system diagram 400, a display 402 (which may correspond to display 130 of FIG. 1) and a remote control 204 are depicted. Similar to FIG. 3 above, in one embodiment, the video game system 110 is executing a video game application 140 that generates a video game output 404, which is presented in the foreground of the primary (or "main") screen of display 402. The video game system 110 may receive a signal that corresponds to a user input (e.g., push of a button) at the video game controller 120, as described above. In FIG. 4, a video application 144 concurrently executing on the video game system 110 generates a media output in the form of video output 406. In this embodiment, video output 406 is depicted as being presented in the foreground within a PIP display. As described earlier, both the video game output 404 and the video output 406 may each include a video output channel and an audio output channel. These channels may be provided into the rendering process that produces a composite audio and video output that is presented on the display 402.

Turning to the behavior when a button of remote control 204 is pushed during the activities described above in reference to FIG. 4, and similar to FIG. 3, the video game system 110 may maintain a mapping in memory which indicates how the signal emitted from the remote control 204 corresponds to controlling one of the concurrently executing applications. At least a portion of this mapping may be represented by FIG. 7 and/or Table 1. In FIG. 4, because the video game application 140 is presenting video game output 404 as a primary application and the video application 144 is presenting video output 406 as a secondary application, with this specific combination of applications presenting output, a subset of the total number of buttons of remote control 204 may be enabled, and the remaining buttons may be disabled. Similar to as depicted in FIG. 3, directional pad button 212, enter button 214, back/cancel button 216, and options button 218 are included in a set of disabled buttons. (For reference, this may also correspond, respectively, to Table 1, rows 13, 16, 19, and 22). In some embodiments, when a disabled button is pushed, the behavior may be similar as described in reference to FIG. 3 above.

The video game system 110 may receive a signal corresponding to the push of a button of the set of enabled buttons, which may, in an example, correspond to the media transport controls button 224. Referring back to the mapping table 700 of FIG. 7 (and Table 1), this scenario and the expected resulting functional output is illustrated by row 3 and/or row 4, depending on which specific video application 144 is executing. In either scenario depicted by row 3 or row 4, the video application 144 (not the video game application 140) is the application that is controlled by the remote control 204. In one example, depicted by row 3, if video application 144 ("Video 1") is executing, then pushing the media transport controls button 224 may either result in fast-forwarding or rewinding a video output 406 (e.g. seeking) in increments of 10 seconds. The button 224 may also be used to play or pause the video output 406 being presented. In another example, depicted by row 4, if video application 144 ("Video 2") is executing, then pushing the media transport controls button 224 may result in fast-forwarding or rewinding the video output 406 in increments of 30 seconds. Similar to row 3, the button 224 may also be used to play or pause the video output being presented.

Similar to FIG. 3 describe above, beyond the media transport controls button 224, there may be several other buttons that are also enabled. Similar technical advantages as described in FIG. 3 also apply.

Figure 5:
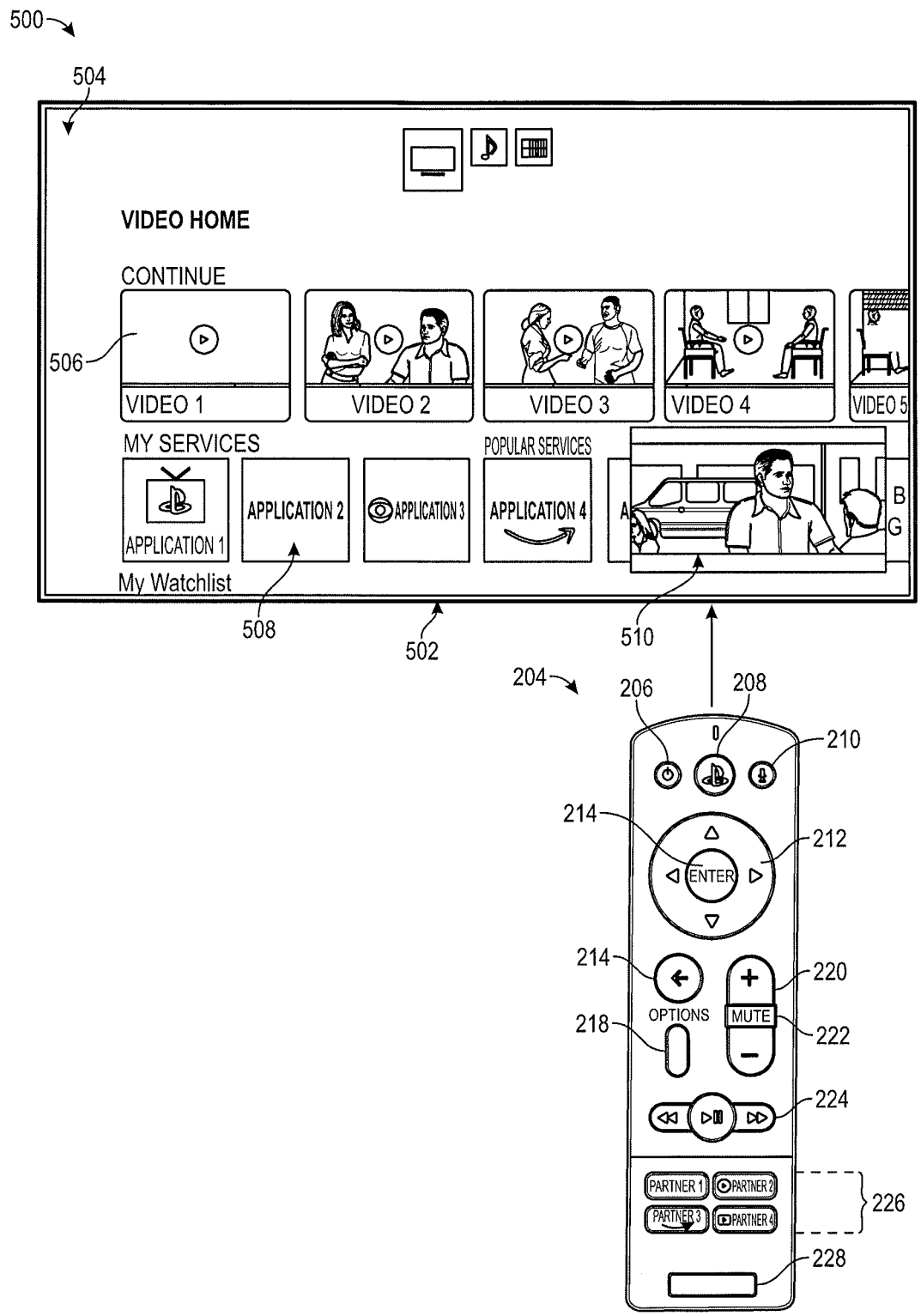
FIG. 5 illustrates a remote control of the computer system that is used to control a native system application or media application, according to embodiments of the present disclosure.

FIG. 5 is a system diagram illustrating a remote control of the computer system that is used to control a native system application or media application, according to embodiments of the present disclosure. In system diagram 500, a display 502 (which may correspond to display 130 of FIG. 1) and a remote control 204 are depicted. In one embodiment, the native system application 152 presents home screen output 504 (e.g., home screen UI) in the foreground of the primary (or "main") screen of display 502. Meanwhile a video application 144 concurrently executing on the video game system 110 generates a media output in the form of video output 510. In this embodiment, video output 510 is depicted as being presented in the foreground within a PIP display.

Turning to the behavior when a button of remote control 204 is pushed during the activities described above in reference to FIG. 5, the video game system 110 may maintain a mapping in memory which indicates how the signal emitted from the remote control 204 corresponds to controlling one of the concurrently executing applications. At least a portion of this mapping may be represented by FIG. 7 and/or Table 1. In FIG. 5, because the native system application 152 is presenting home screen output 504 as a primary application and the video application 144 is presenting video output 406 as a secondary application, with this specific combination of applications presenting output, in one embodiment, and in contrast with FIGS. 3-4, all of the buttons of remote control 204 may be enabled. However, different buttons of the remote control 204 may be mapped to respectively control different applications, as shown in Table 1. More specifically, a first set of buttons (e.g., media transport controls button 224 (row 5)) may be mapped to controlling the secondary application (video application 144), while a second set of buttons (e.g., voice control button 210 (row 11), directional pad button 212 (row 14), enter/select button 214 (row 17), back/cancel button 216 (row 20), options button 218 (row 23)) may be mapped to controlling the primary application (native system application 152).

As an example, based on the mapping of the first set of buttons, the video game system 110 may, upon receiving a user input from the remote control 204 corresponding to the pushing of the media transport controls button 224, seek forward through the video output 510 being displayed in the PIP display (e.g., secondary application). Without switching a focus between the video application 144 and the native system application 152, based on the mapping of the second set of buttons, and upon receiving a user input from the remote control 204 corresponding to the pushing of the directional pad button 212, the video game system 110 may output a command to change an aspect of navigate the home screen UI. These home screen UI aspect changes may include, for example, updating a list of video contents 506 displayed upon receiving a command to advance to a next page.

For each of the embodiments described herein, when transitioning between different applications presenting output on the display 130, the video game system 110 may first exit a currently presenting application, or move the presenting application to the background, so that another application can become a new primary or secondary application presenting on the display. As such, the mapping may also define which button of the buttons of remote control 204 may be used to exit a particular application or switch between applications. In an example, the pushing of the home button 208 may be used to activate the menu application 150 to present the menu UI 112 on display 130. The mapping may further indicate which button may be pushed within the menu UI which triggers the video game system 110 to exit a particular application. In reference to transitioning from the FIG. 4 scenario to the FIG. 5 scenario, for example, the video game system may, upon receiving a signal corresponding to user input at the remote control 204, first launch the menu application 150, then exit the video game application 140 that is presenting video game output 404. In some embodiments, the system may, upon exiting the video game application 140, automatically launch the native system application 152 to present the home screen UI 504 of FIG. 5.

It should be understood that a technical advantage of the present disclosure is that the user 122 may be able to concurrently interact with the home screen UI 504 (e.g., browsing through content via the remote control 204), while interacting with the PIP media application (e.g., video application 144) using the same remote control 204, and without needing to switch any application's focus (e.g., from background to foreground, or secondary application to primary application). It should be understood that this technical advantage and others described herein may also apply to using the remote control 204 to control other applications (e.g., social media application 146, chat application 148) while the home screen UI 504 may be presenting in the background, with any suitable mapping provided to enable the embodiments presently disclosed.

Figure 6:
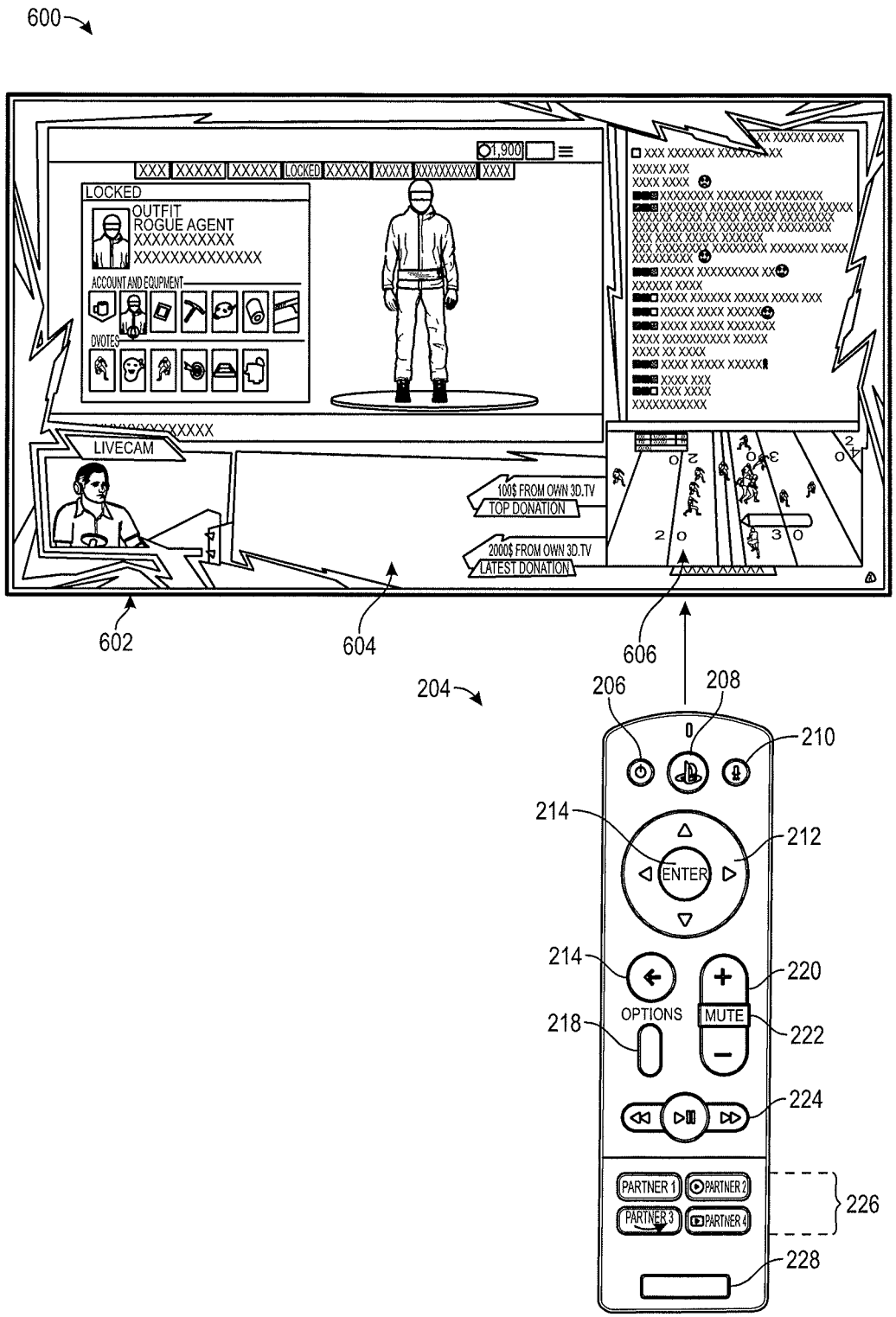
FIG. 6 illustrates a remote control of the computer system that is used to control either a first media application or a second media application, according to embodiments of the present disclosure.

FIG. 6 is a system diagram illustrating a remote control of the computer system that is used to control either a first media application or a second media application, according to embodiments of the present disclosure. In system diagram 600, a display 602 (which may correspond to display 130 of FIG. 1) and a remote control 204 are depicted. In one embodiment, a first media application (e.g., a first video application 144) generates and presents a first media output 604 (e.g., first video output 604) in the foreground of the primary (or "main") screen of display 602. Meanwhile a second media application (e.g., a second video application 144) concurrently executing generates and presents in the foreground of a PIP display a second media output 606 (e.g., second video output 606) on display 602. Note that other suitable media applications (e.g., social media application 146, chat application 148) may also be used to implement embodiments of the present disclosure.

Turning to the behavior when a button of remote control 204 is pushed during the activities described above in reference to FIG. 6, the video game system 110 may maintain a mapping in memory which indicates how the signal emitted from the remote control 204 corresponds to controlling one of the concurrently executing applications. At least a portion of this mapping may be represented by FIG. 7 and/or Table 1. In FIG. 6, and continuing with the example above, because the first video application 144 is presenting a first video output 604 as a primary application and the second video application 144 is presenting a second video output 606 as a secondary application, this specific combination of applications may produce a mapping such that all the buttons of the remote control are enabled (e.g., all buttons are included in a first set of buttons), and, by default, are used to control the primary application. For example, according to Table 1, row 6, upon receiving a signal corresponding to the push of the media transport controls button 224 to seek forward, the video game system 110 will output a command to control the main application that causes the first video output 604 to seek forward. This mapping pattern may also apply to other buttons, for example, the voice control button 210 (row 12), directional pad button 212 (row 15), enter button 214 (row 18), back button 216 (row 21), and options button 218 (row 24), which may control the main application by default.

However, as further depicted in Table 1, row 7, one or more buttons of the remote control 204 may be pushed which, upon receipt and processing by the video game system 110, causes a subset (e.g., a second set) of the first set of buttons to be reconfigured to be mapped to control the second video application 144 presenting as the secondary application (e.g., PIP). In an example, a signal corresponding to the home button 208 being pushed is received and processed, which activates the menu application 150 to present the menu UI 112 (e.g., control center) on display 602. Within the control center, the mapping may indicate that the activation of a UI control of the control center (e.g., toggle button, check box, etc.) corresponds with the pushing of a button on the remote control to toggle the display's 602 focus between the first video output 604 and the second video output 606. The mapping described above may further indicate that, based on which application is selected by the toggle control, the one or more of the buttons of the remote control 204 may be re-mapped to be able to control the second video application 144. Continuing with the example above, upon receiving user input corresponding to the pushing of the toggle button, the video game system 110 may toggle to focus from the first video output 604 to the second video output 606. In one embodiment, the media transport controls button 224 may be re-mapped to control the secondary application. It should be understood that more than one button of the first set may be re-mapped (e.g., as a second set) to now control a function of the secondary application.

In some embodiments, some applications on the video game system 110 may be applications (e.g., media applications) provided by third-party partners. As such, some third-party applications may be given their own custom button 226 on the remote control 204. Furthermore, in some embodiments, the third-party partners may be able to customize a partner custom feature button 228, such that, when the video game system 110 receives a signal corresponding to the pushing of the partner custom feature button 228, a customized function of the third-party application will be executed. In an example, a third-party video application 144 may customize the button 228 such that, when pushed, and the mapping so indicates, the application 144 may purchase the video content currently being presented (Table 1, row 28). In another example, a different third-party application may save the presenting video content to the user's 122 favorites list (Table 1, row 29). Accordingly, one technical advantage of the present disclosure is that the method of mapping described above may also apply to third-party providers in enabling them to customize the behavior of certain buttons, depending the context in which the provider's application is executing in (e.g., primary or secondary application, application type, etc.).

Figure 8:
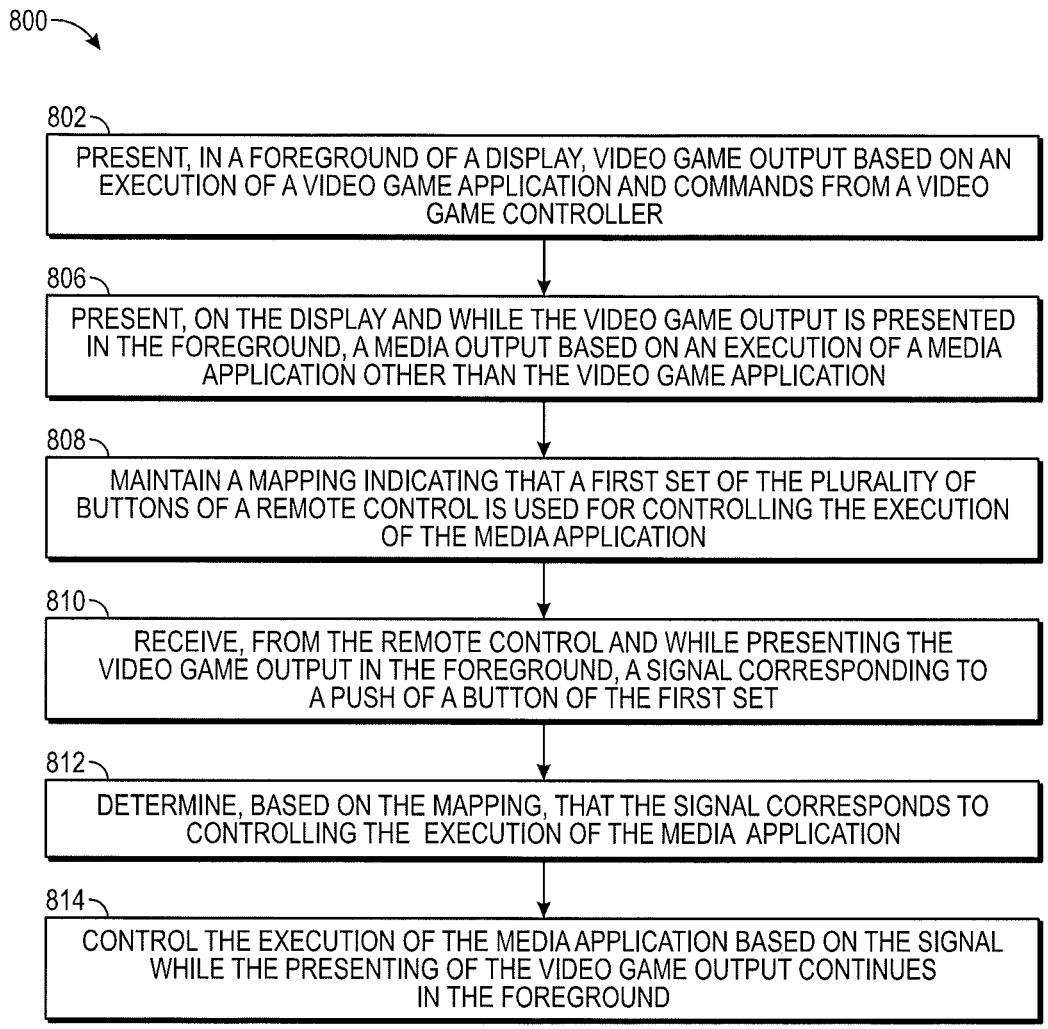
FIG. 8 illustrates an example flow for controlling execution of a media application while a video game output is presented in the foreground, according to embodiments of the present disclosure.

FIG. 8 illustrates an example flow 800 for controlling execution of a media application while a video game output is presented in the foreground, according to embodiments of the present disclosure. In some embodiments, flow 800 may correspond to the operations described in reference to FIGS. 3 & 4. Although the operations are illustrated in a particular order, some of the operations can be re-ordered or omitted. Also, some or all of the flow 800 (or any other flows described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program including a plurality of instructions executable by one or more processors. The computer-readable storage medium may be non-transitory.

In an example, the flow includes an operation 802, which involves presenting, in a foreground of a display 130, video game output based on an execution of a video game application 140 and commands from a video game controller 120. As described above, the display 130 may include, for example, a display device (e.g., TV). In an example, and referencing FIG. 4, the video game system 110 receives a user interaction (e.g., in the form of the signal emitted from the video game controller 120) corresponding to the user 122 pushing a button of the video game controller 120. The video game system 110 processes the user interaction and launches the video game application 140, which may then present the video game output 404 in the main screen as a primary application. In some embodiments, any suitable video game application 140 may be executed to perform the flow 800.

In an example, the flow includes an operation 804, which involves presenting, on the display and while the video game output is presented in the foreground, a media output based on an execution of a media application other than the video game application. The media output, for example, may correspond to output from one of the media applications 142-148. In an example, after receiving user interaction (e.g., in the form of a signal) corresponding to the user 122 pushing a button of the remote control 204, the video game system 110 launches a media application (e.g., video application 144). In an example referencing FIG. 4, upon the video game system 110 launching the video application 144, the media output (e.g., video output 404) may be presented in the foreground 406 (e.g., PIP) of the display 402. In another example referencing FIG. 3, in which the media application is a music application 142, the music output 306 may be presented in the background 306. It should be understood that there may be several possible layouts (e.g., PIP, side-by-side, UI hidden in background, etc.) for presenting media output in either the foreground or background, as described above. In an example, whether or not the media output is presented in the foreground or background, the video game application 140 may continue to execute in the foreground and allow the user to interact with the video game application 140.

In an example, the flow includes an operation 806, which involves maintaining a mapping indicating that a first set of the plurality of buttons of a remote control is used for controlling the execution of the media application. As discussed above in reference to FIG. 7 & Table 1, the mapping may be maintained in memory of the video game system 110. The first set may be one or more buttons of the remote control 204 (e.g., media transport controls button 224). In some embodiments, the mapping may be used to determine, upon the pushing of a button of the remote control 204, whether the button is enabled or disabled, which application is controlled (e.g., primary/main screen application or secondary application), and how the execution of the media application is controlled (e.g., what aspect of the particular media application's media output is changed upon the pushing of the particular button (e.g., seeking in a video output, purchasing a video, etc.)). In some embodiments, the mapping may be used to associate a button with further behavior than is listed in FIG. 7 and Table 1. In an example, the mapping may determine, for a given button that is pushed, whether to transmit a signal back to the remote control 204, for the remote control 204 to take further action (e.g., illuminating the button to signal that it is disabled). Additionally, as a new application is installed or removed from the video game system 110, the mapping may be updated as suitable.

In an example, the flow includes an operation 808, which involves receiving, from the remote control and while presenting the video game output in the foreground, a signal corresponding to a push of a button of the first set. In some embodiments, the video game system 110 receives a user interaction (e.g., in the form of a signal) corresponding to the pushing of a button of the first set (e.g., defined by the mapping being maintained in operation 806) by the user 122. Upon the particular button being pushed, the remote control 204 may emit a particular type of signal (e.g., IR, Bluetooth, etc.), according to the button that is pushed. It should be understood that the video game system 110 may receive and process the signal being transmitted by the remote control 204, even as the video game system 110 may be concurrently receiving and processing signals (e.g., received from the video game controller 120) to control the execution of the video game application 140.

In an example, the flow includes an operation 810, which involves determining, based on the mapping, that the signal corresponds to controlling the execution of the media application. In some embodiments, this determination may be performed based on the portion of the mapping that specifies which application is to be controlled (e.g., FIG. 7, column 712) and what application function should be executed (e.g., FIG. 7, column 714). In some embodiments, this determination may be performed by the signal processing application 154, as described above, which may then route the digital output (e.g., corresponding to the input from remote control 204) to the appropriate media application.

In an example, the flow includes an operation 812, which involves controlling the execution of the media application based on the signal while the presenting of the video game output continues in the foreground. In an example, following the routing of the remote control command to the appropriate media application in operation 810, the video game system 110 may control the execution of the media application by performing one or more steps that cause a change in an aspect of the media output. It should be understood that the particular change in media output may result in a change to any one or more of component channels that are included within the particular media output (e.g., audio channel, video channel). Furthermore, the change in an aspect of the media output may involve changing an aspect of a composite output (e.g., via a rendering process, described above, which receives the media output and the video game output as distinct inputs).

Figure 9:
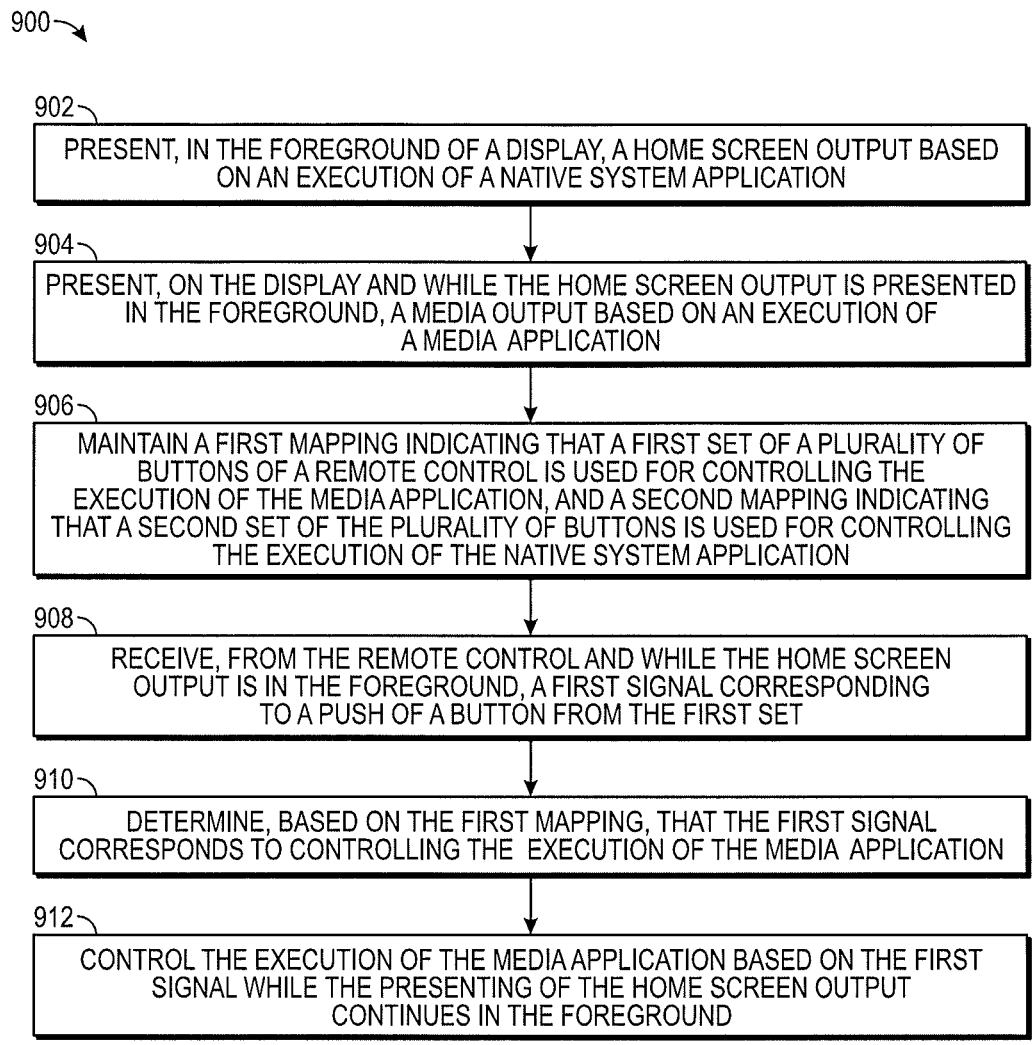
FIG. 9 illustrates an example flow for controlling execution of a media application while a home screen output is presented in the foreground, according to embodiments of the present disclosure.

FIG. 9 illustrates an example flow for controlling execution of a media application while a home screen output is presented in the foreground, according to embodiments of the present disclosure. In some embodiments, flow 900 may correspond to the operations described in reference to FIG. 5.

In an example, the flow includes an operation 902, which involves presenting, in the foreground of a display, a home screen output based on an execution of a native system application. While procedurally similar to operation 802 of flow 800, instead of presenting the video game output 404 on the display, the home screen output 504 of native system application 152 may be presented in the foreground (e.g., main screen) of display 502. As described above, in some embodiments, the video game system 110 may first exit an application executing in the foreground (e.g., video game application 140) upon receiving a user interaction (e.g., in the form of a signal) corresponding to the user 122 pushing a button, and then subsequently automatically launch and/or activate the native system application 152.

In an example, the flow includes an operation 904 which involves presenting, on the display and while the home screen output is presented in the foreground, a media output based on an execution of a media application. In some embodiments, except for the home screen output rather than the video game output being concurrently presented on the display 502, operation 904 may be substantially similar to operation 804 of flow 800.

In an example, the flow includes an operation 906 which involves maintaining a first mapping indicating that a first set of a plurality of buttons of a remote control is used for controlling the execution of the media application, and a second mapping indicating that a second set of the plurality of buttons is used for controlling the execution of the native system application. In some embodiments, operation 906 may be similar to operation 806 of flow 800, in that a mapping is maintained in memory, which may correspond to Table 1 or FIG. 7. However, in addition to a first set of buttons being able to control the media application, a second set of buttons (distinct from the first set) may be used to control the native system application. It should be understood that, although a first and second mapping are described above, this is for illustration purposes only. In this example, and also applicable to any of the flows described herein, a plurality of mappings may be included within the same global mapping table (e.g., Table 1).

In an example, the flow includes an operation 908 which involves receiving, from the remote control and while the home screen output is in the foreground, a first signal corresponding to a push of a button from the first set. In some embodiments, the transmission of the signal by the remote control 204 and the reception of the signal by the video game system 110 may be substantially similar to operation 808 of flow 800. It should be understood that, although operation 908 describes a signal corresponding to a push of a button from the first set, in another embodiment, the signal may instead correspond to a push of a button from the second set (e.g., corresponding to controlling the execution of the native system application). (In the case of pushing a button from the second set, the below operations 910, 912 would correspond to controlling the native system application 152 instead of the media application.) The video game system 110 may perform this operation 908 without requiring a user interaction (e.g., in the form of a signal) corresponding to the push of a button to switch a focus from one application to another. In this way, the video game system 110 enables concurrently user 112 interaction with both applications from the same remote control 204.

In an example, the flow includes an operation 910 which involves determining, based on the first mapping, that the first signal corresponds to controlling the execution of the media application. In some embodiments, the video game system 110 performs substantially similar steps in operation 910 as in operation 810 of flow 800.

In an example, the flow includes an operation 912 which involves controlling the execution of the media application based on the first signal while the presenting of the home screen output continues in the foreground. In some embodiments, the video game system 110 performs substantially similar steps in operation 912 as in operation 812 of flow 800.

Figure 10:
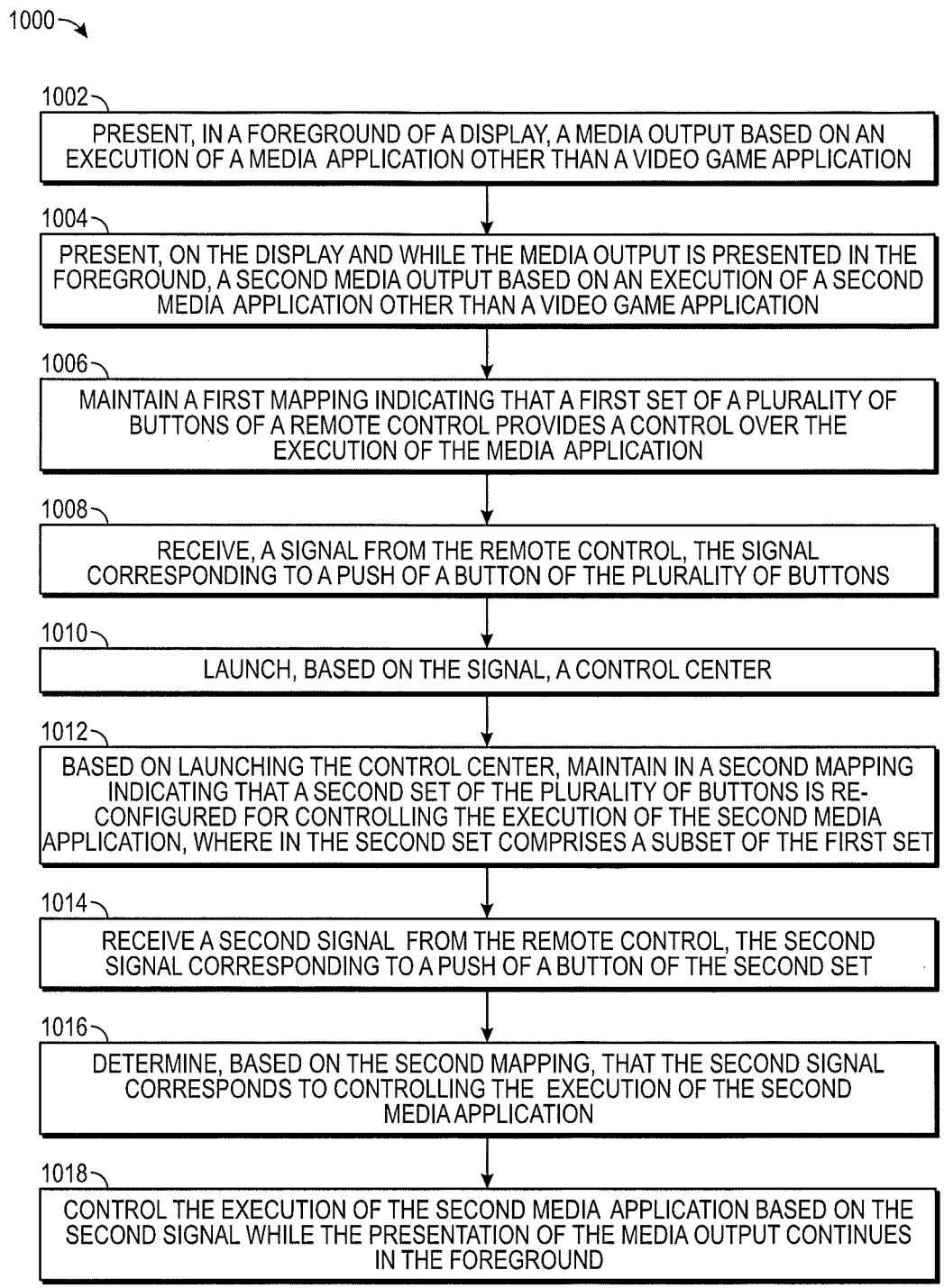
FIG. 10 illustrates an example flow for controlling execution of a second media application while another media application is presented in the foreground, according to embodiments of the present disclosure.

FIG. 10 illustrates an example flow for controlling execution of a second media application while another media application is presented in the foreground, according to embodiments of the present disclosure. In some embodiments, flow 1000 may correspond to the operations described in reference to FIG. 6.

In an example, the flow includes an operation 1002 which involves presenting, in the foreground of a display, a media output based on an execution of a media application other than a video game application. In some embodiments, the media output 604 may correspond to output from one of the media applications 142-148. In some embodiments, the media output 604 may be presented in the main screen 604 of display 602. Similar to as described in operation 902, in some embodiments, the video game system 110 may first exit an application executing in the foreground (e.g., video game application 140) upon receiving a user interaction (e.g., in the form of a signal) corresponding to the user 122 pushing a button. Then, upon receiving a subsequent user interaction (e.g., in the form of another signal) corresponding to the user 122 pushing a button, the video game system 110 may launch the media application.

In an example, the flow includes an operation 1004 which involves presenting, on the display and while the media output is presented in the foreground, a second media output based on an execution of a second media application other than a video game application. In some embodiments, the second media application may be launched and presented similar to the media application in operation 804 (e.g., presented in the foreground via a PIP display, or in the background with the media application's GUI being hidden from display).

In an example, the flow includes an operation 1006 which involves maintaining a first mapping indicating that a first set of a plurality of buttons of a remote control provides a control over the execution of the media application. As discussed earlier, in some embodiments, the first mapping may indicate that the first set includes all the buttons of the remote control 204, and that all the buttons are enabled. In other embodiments, the first set may include a subset of buttons of the remote control 204 that are enabled to control the execution of the media application, while other buttons, in an example, may be disabled.

In an example, the flow includes an operation 1008 which involves receiving a signal from the remote control, the signal corresponding to a push of a button of the plurality of buttons. In some embodiments, the button pushed may correspond to the home button 208.

In an example, the flow includes an operation 1010 which involves launching, based on the signal, a control center. In some embodiments, the video game system 110 may, upon receiving the signal (e.g., user interaction corresponding to the pushing of a button of the remote control 204 by the user), activate the menu application 150 to present the control center 112 on the display 130. In an example, the control center 112 may present as a GUI menu, or any other suitable GUI.

In an example, the flow includes an operation 1012 which involves, based on launching the control center, maintaining a second mapping indicating that a second set of the plurality of buttons is re-configured for controlling the execution of the second media application, wherein the second set comprises a subset of the first set. In some embodiments, once the control center has been activated in operation 1010, the video game system 110 may receive a user interaction (e.g., in the form of a signal) corresponding to the push of a button of the remote control 204 by the user to toggle an application focus from the media application (presenting as media output 604) to the second media application (presenting as second media output 606). In some embodiments, the mapping table (e.g., Table 1, row 7) may have one or more entries which indicate how the second set of buttons is to be re-configured. In the example of Table 1, row 7, after the video game system 110 toggles the application focus, the media transport controls button 224 will be mapped to control the second media application. The remaining buttons that are not re-configured may still be mapped to control the media application.

In an example, the flow includes an operation 1014 which involves receiving a second signal from the remote control, the second signal corresponding to a push of a button of the second set. In some embodiments, operation 1014 may involve similar steps as operation 808 (with a difference being that the button being pushed is within the second set of re-configured buttons, thus transmitting a different signal to control the execution of the second media application).

In an example, the flow includes an operation 1016 which involves determining, based on the second mapping, that the second signal corresponds to controlling the execution of the second media application. In some embodiments, operation 1016 may involve similar steps as operation 810.

In an example, the flow includes an operation 1018 which involves controlling the execution of the second media application based on the second signal while the presentation of the media output continues in the foreground. In some embodiments, operation 1018 may involve similar steps as operation 812.

Figure 11:
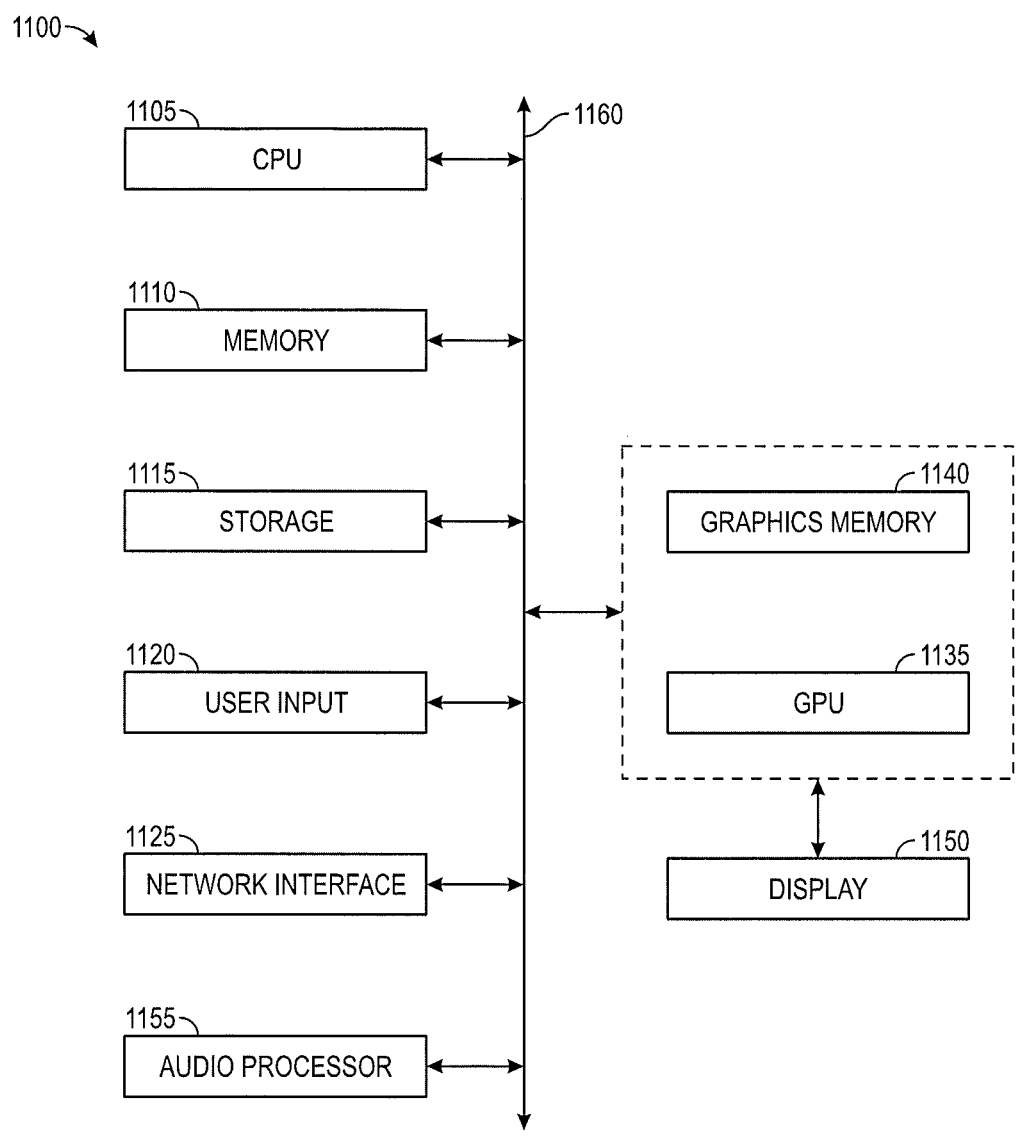
FIG. 11 illustrates an example of a hardware system suitable for implementing a computer system, according to embodiments of the present disclosure.

FIG. 11 illustrates an example of a hardware system suitable for implementing a computer system 1100 in accordance with various embodiments. The computer system 1100 represents, for example, components of a computer system, video game system, a mobile user device, a proximity device, a wearable gesture device, and/or a central computer. The computer system 1100 includes a central processing unit (CPU) 1105 for running software applications and optionally an operating system. The CPU 1105 may be made up of one or more homogeneous or heterogeneous processing cores. Memory 1110 stores applications and data for use by the CPU 1105. Storage 1115 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1120 communicate user inputs from one or more users to the computer system 1100, examples of which may include keyboards, mice, joysticks, touch pads, touch screens, still or video cameras, and/or microphones. Network interface 1125 allows the computer system 1100 to communicate with other computer systems via an electronic communications network, and may include wired or wireless communication over local area networks and wide area networks such as the Internet. An audio processor 1155 is adapted to generate analog or digital audio output from instructions and/or data provided by the CPU 1105, memory 1110, and/or storage 1115. The components of computer system 1100, including the CPU 1105, memory 1110, data storage 1115, user input devices 1120, network interface 1125, and audio processor 1155 are connected via one or more data buses 1160.

A graphics subsystem 1130 is further connected with the data bus 1160 and the components of the computer system 1100. The graphics subsystem 1130 includes a graphics processing unit (GPU) 1135 and graphics memory 1140. The graphics memory 1140 includes a display memory (e.g., a frame buffer) used for storing pixel data for each pixel of an output image. The graphics memory 1140 can be integrated in the same device as the GPU 1135, connected as a separate device with the GPU 1135, and/or implemented within the memory 1110. Pixel data can be provided to the graphics memory 1140 directly from the CPU 1105. Alternatively, the CPU 1105 provides the GPU 1135 with data and/or instructions defining the desired output images, from which the GPU 1135 generates the pixel data of one or more output images. The data and/or instructions defining the desired output images can be stored in the memory 1110 and/or graphics memory 1140. In an embodiment, the GPU 1135 includes 3D rendering capabilities for generating pixel data for output images from instructions and data defining the geometry, lighting, shading, texturing, motion, and/or camera parameters for a scene. The GPU 1135 can further include one or more programmable execution units capable of executing shader programs.

The graphics subsystem 1130 periodically outputs pixel data for an image from the graphics memory 1140 to be displayed on the display device 1150. The display device 1150 can be any device capable of displaying visual information in response to a signal from the computer system 1100, including CRT, LCD, plasma, and OLED displays. The computer system 1100 can provide the display device 1150 with an analog or digital signal.

In accordance with various embodiments, the CPU 1105 is one or more general-purpose microprocessors having one or more processing cores. Further embodiments can be implemented using one or more CPUs 1105 with microprocessor architectures specifically adapted for highly parallel and computationally intensive applications, such as media and interactive entertainment applications.

The components of a system may be connected via a network, which may be any combination of the following: the Internet, an IP network, an intranet, a wide-area network ("WAN"), a local-area network ("LAN"), a virtual private network ("VPN"), the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. "About" includes within a tolerance of ±0.01%, ±0.1%, ±1%, ±2%, ±3%, ±4%, ±5%, ±8%, ±10%, ±15%, ±20%, ±25%, or as otherwise known in the art. "Substantially" refers to more than 66%, 75%, 80%, 90%, 95%, 99%, 99.9% or, depending on the context within which the term substantially appears, value otherwise as known in the art.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A computer system comprising:
   a first input device configured to control one or more media applications;
   a second input device configured to control one or more video game applications;
   a video game system communicatively coupled with the first input device and the second input device, the video game system comprising:
   a processor; and
   a memory storing instructions that, upon execution by the processor, cause the video game system to:
      present, in a foreground of a display, video game output based on an execution of a video game application and commands from the second input device;
      present, on the display and while the video game output is presented in the foreground, a media output based on an execution of a media application other than the video game application;
      maintain a mapping indicating that a first set of a plurality of user inputs received at the first input device is used for controlling the execution of the media application;
      receive, from the first input device and while presenting the video game output in the foreground, a signal corresponding to a first user input of the first set;
      determine, based on the mapping, that the signal corresponds to controlling the execution of the media application; and
      control the execution of the media application based on the signal while the presenting of the video game output continues in the foreground.

2. The computer system of claim 1, wherein the first input device is a remote control, wherein the second input device is a video game controller, wherein the first user input is a push of a button of the remote control, and wherein the execution of the instructions further causes the video game system to:
   present the media output in the foreground of the display, wherein the media output is presented in conjunction with the video game output, and controlling the execution of the media application comprises changing an aspect of the media output.

3. The computer system of claim 2, wherein presenting the media output and presenting the video game output comprises presenting a composite output based on a rendering process that receives the media output from the media application and the video game output from the video game application as distinct inputs.

4. The computer system of claim 1, wherein the media output is presented in a background of the display, and wherein controlling the execution of the media application comprises changing an aspect of the media output while maintaining the media output in the background.

5. The computer system of claim 1, wherein the execution of the instructions further causes the video game system to:
   determine, based on the mapping, that a second set of the plurality of user inputs is not used for controlling the execution of the media application, the second set being different from the first set; and
   responsive to receiving a second signal corresponding to a second user input of the second set, ignore the second signal.

6. The computer system of claim 1, wherein the execution of the instructions further causes the video game system to:
present, in the foreground of the display, a home screen output based on an execution of a native system application;
receive, from the first input device and while the home screen output is in the foreground, a second signal corresponding to a second user input of the first set;
determine, based on the mapping, that the second signal corresponds to controlling the execution of the media application; and
control the execution of the media application based on the second signal while the presenting of the home screen output continues in the foreground.

7. The computer system of claim 6, wherein, the mapping further indicates that a second set of the plurality of user inputs is used for controlling the execution of the native system application, wherein the execution of the instructions further causes the video game system to:
receive, from the first input device, a third signal corresponding to a third user input of the second set;
determine, based on the mapping, that the third signal corresponds to controlling the execution of the native system application; and
control the execution of the native system application based on the third signal while the presenting of the media output continues on the display.

8. The computer system of claim 7, wherein the mapping defines the controlling of the execution of the media application, the controlling of the execution of the native system application, and controlling the execution of the video game application, the execution of the instructions further causing the video game system to:
prior to presenting the home screen output, receive a third signal from the first input device, the third signal corresponding to a fourth user input; and
based on the mapping and responsive to the receiving the third signal, exit the video game application.

9. The computer system of claim 1, wherein the first input device is a remote control, wherein the mapping indicates a state of a button of the remote control, and wherein the state is one of enabled or disabled and changes based on executed applications.

10. The computer system of claim 1, wherein the first input device is a remote control, wherein a button of the remote control is configured to enable fast-forwarding or rewinding the media output on the display.

11. A video game system comprising:
a processor; and
a memory storing instructions that, upon execution by the processor, cause the video game system to:
present, in a foreground of a display, video game output based on an execution of a video game application and commands from a first input device;
present, on the display and while the video game output is presented in the foreground, a media output based on an execution of a media application other than the video game application;
receive, while the video game output is in the foreground, a signal from a second input device, the second input device communicatively coupled with the video game system and configured to control the media application based on a plurality of user inputs, the plurality of user inputs comprising a first set of user inputs, the signal corresponding to a first user input of the first set;
maintain a mapping indicating that the first set is used for controlling the execution of the media application;
determine, based on the mapping, that the signal corresponds to controlling the execution of the media application; and
control the execution of the media application based on the signal while the presenting of the video game output continues in the foreground.

12. The video game system of claim 11, wherein the execution of the instructions further causes the video game system to:
present the media output in the foreground of the display, wherein the media output is presented in conjunction with the video game output, and controlling the execution of the media application comprises changing an aspect of the media output.

13. The video game system of claim 11, wherein the media output is presented in a background of the display, and wherein controlling the execution of the media application comprises changing an aspect of the media output while maintaining the media output in the background.

14. The video game system of claim 11, wherein the execution of the instructions further causes the video game system to:
determine, based on the mapping, that a second set of user inputs is not used for controlling the execution of the media application; and
responsive to receiving a signal corresponding to a second user input of the second set, ignore the signal.

15. The video game system of claim 11, wherein the execution of the instructions further causes the video game system to:
present the media output in the foreground of the display;
receive a command from the first input device while the media output is in the foreground; and
based on the command, change an aspect of the video game output while the presenting of the media output continues in the foreground.

16. The video game system of claim 11, wherein the mapping further indicates that a second of user inputs set is used for controlling an execution of a native system application, wherein the execution of the instructions further causes the video game system to:
present, in the foreground of the display, a home screen output based on an execution of the native system application;
continue presenting, on the display and while the home screen output is presented in the foreground, the media output;
receive, from the second input device and while the home screen output is in the foreground, a second signal corresponding to a second user input of the second set;
determine, based on the mapping, that the second signal corresponds to controlling the execution of the native system application; and
control the execution of the native system application based on the second signal while the presentation of the media output continues on the display.

17. A non-transitory computer-readable storage medium storing instructions that, upon execution on a video game system, configure the video game system to perform operations comprising:
presenting, in a foreground of a display, video game output based on an execution of a video game application;

presenting, on the display and while the video game output is presented in the foreground, a media output based on an execution of a media application other than the video game application and commands from controller a first input device;

receiving, while the video game output is in the foreground, a signal from a second input device, the second input device communicatively coupled with the video game system and configured to control the media application based on a plurality of user inputs, the plurality of user inputs comprising a first set of user inputs, the signal corresponding to a first user input of the first set;

maintaining a mapping indicating that the first set is used for controlling the execution of the media application;

determining, based on the mapping, that the signal corresponds to controlling the execution of the media application; and controlling the execution of the media application based on the signal while the presentation of the video game output continues in the foreground.

18. The non-transitory computer-readable storage medium of claim 17, wherein the operations further comprise:

continuing to present on the display the media output;

presenting, in the foreground of the display, a second media output based on an execution of a second media application other than the video game application;

maintaining a second mapping indicating that a second set of the plurality of user inputs is used for controlling the execution of the second media application;

receiving a second signal from the second input device, the second signal corresponding to a second user input of the plurality of user inputs;

launching, based on the second signal, a control center;

based on launching the control center, maintaining a third mapping indicating that a third set of one or more user inputs of the plurality of user inputs is re-configured for controlling the execution of the media application, wherein the third set comprises a subset of the second set;

receiving a third signal from the second input device, the third signal corresponding to a third user input of the third set;

determining, based on the third mapping, that the third signal corresponds to controlling the execution of the media application; and controlling the execution of the media application based on the third signal while the presentation of the second media output continues in the foreground.

19. The non-transitory computer-readable storage medium of claim 18, wherein the mapping further indicates that a toggle button of the second input device is configured to toggle a focus between the second media output and the media output, the operations for launching the control center further comprising:

responsive to receiving a fourth signal from the toggle button to toggle the focus, generating the third mapping.

20. The non-transitory computer-readable storage medium of claim 18, wherein the mapping defines the controlling of the execution of the media application and controlling the execution of the video game application, the operations further comprising:

prior to presenting the second media output, receiving a fourth signal from the second input device, the fourth signal corresponding to a push of an exit button of the second input device; and responsive to the receiving the fourth signal and based on the mapping, exit the video game application.

* * * * *